United States Patent
Macfarlane

(10) Patent No.: US 8,830,702 B2
(45) Date of Patent: Sep. 9, 2014

(54) SEMI RESONANT SWITCHING REGULATOR, POWER FACTOR CONTROL AND LED LIGHTING

(76) Inventor: Alistair Allan Macfarlane, East Kilbride (GB)

(*) Notice: Subject to any disclaimer, the term of this patent is extended or adjusted under 35 U.S.C. 154(b) by 572 days.

(21) Appl. No.: 13/175,417

(22) Filed: Jul. 1, 2011

(65) Prior Publication Data

US 2012/0169240 A1    Jul. 5, 2012

(30) Foreign Application Priority Data

Jul. 1, 2010 (GB) .................................. 1011081.1
Sep. 30, 2010 (GB) .................................. 1016473.9

(51) Int. Cl.
*H02M 3/335* (2006.01)

(52) U.S. Cl.
USPC .................... 363/17; 363/16; 363/18; 363/19

(58) Field of Classification Search
USPC ......................................... 363/16, 17, 18, 19
See application file for complete search history.

(56) References Cited

U.S. PATENT DOCUMENTS 8,559,193 B2 * 10/2013 Mazumder ........................ 363/8
8,575,854 B2 * 11/2013 Nakamura ..................... 315/291

2001/0019491 A1   9/2001   Yasumura
2005/0018458 A1   1/2005   Shimada et al.
2008/0258647 A1   10/2008  Scianna
2012/0063184 A1 * 3/2012   Mazumder ........................ 363/98
2012/0112795 A1 * 5/2012   Wang et al. ..................... 327/86

FOREIGN PATENT DOCUMENTS

| CN | 1352483 | 6/2002 |
|---|---|---|
| CN | 101630904 | 1/2010 |
| CN | 101631410 | 1/2010 |
| EP | 0665633 | 8/1995 |
| EP | 0772281 | 5/1997 |
| JP | 2001339943 | 12/2001 |

* cited by examiner

*Primary Examiner* — Tuyet Thi Vo
(74) *Attorney, Agent, or Firm* — Workman Nydegger

(57) ABSTRACT

Described are improvements in power factor control and systems embodying said improved power factor control. Improvements lie in a method of zero voltage switching in which a capacitor is placed in parallel with a switching device, and the switching device is operated responsive to a change in the polarity of the current through the capacitor. Switching therefore occurs at zero or close to zero voltage across the switching device in both on and off modes resulting in very low switching losses and electromagnetic interference. Systems employing the method include a power factor controller, LED light source, boost converter and a power source comprising one or more photovoltaic cells.

10 Claims, 13 Drawing Sheets

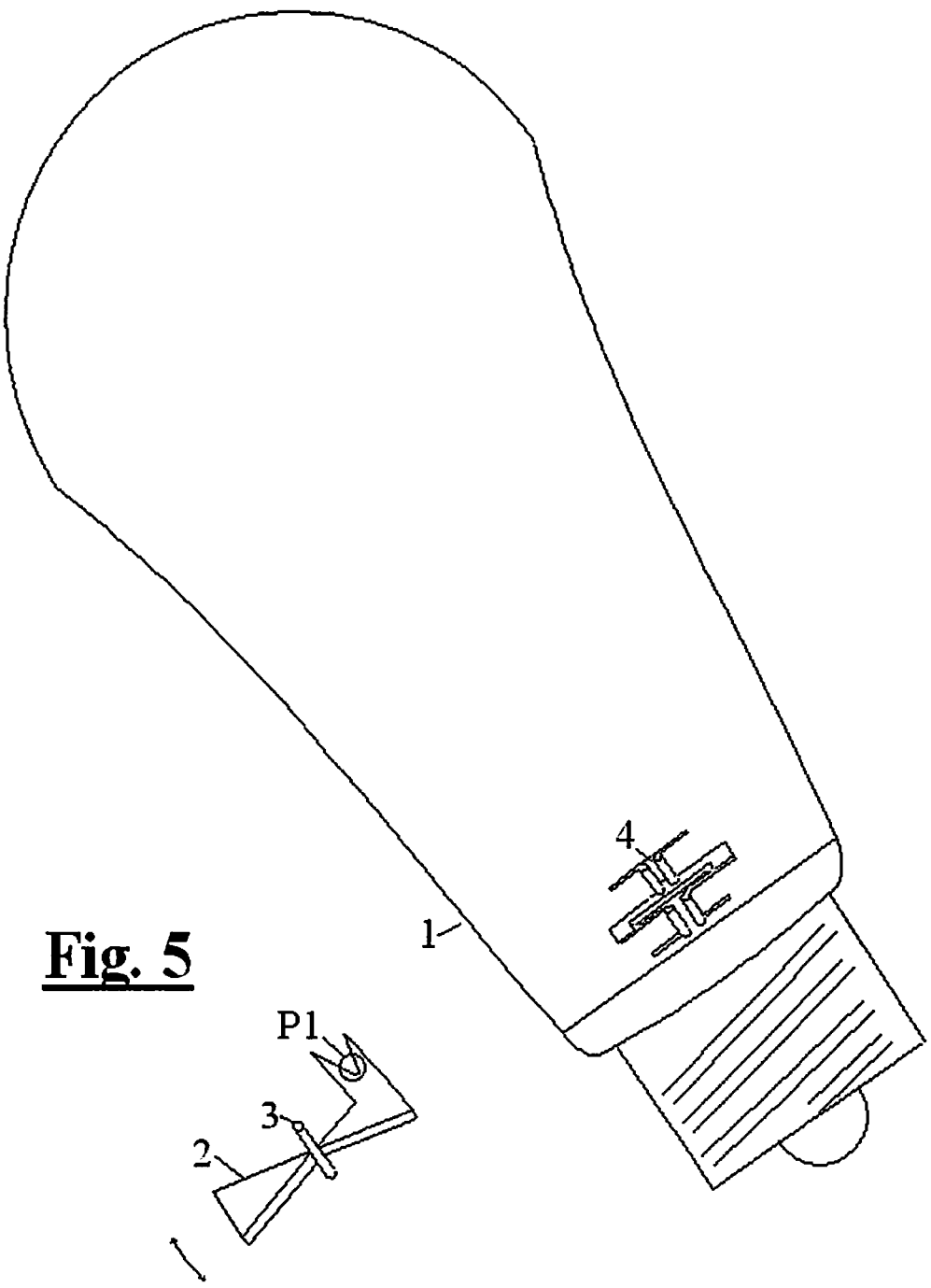

SEMI RESONANT SWITCHING REGULATOR, POWER FACTOR CONTROL AND LED LIGHTING

CROSS-REFERENCE TO RELATED APPLICATIONS

The present invention claims the benefit of priority under 35 U.S.C. §119 to United Kingdom Patent Application No. GB1011081.1, filed on Jul. 1, 2010, and to United Kingdom Patent Application No. GB1016473.9, filed on Sep. 30, 2010, the content of each of which is hereby incorporated by reference in its entirety.

BACKGROUND OF THE INVENTION

1. The Field of the Invention

The present invention relates to improvements in power factor control, and to systems embodying said improved power factor control; in particular, an LED lamp.

2. The Relevant Technology

Power factor control is considered desirable to mitigate the effects of high harmonic currents drawn from the mains supply line by non-linear loads such as rectifier and smoothing capacitor input stages.

One method of achieving this is to employ a boost converter charging a storage capacitor to a voltage higher than the peak voltage of the incoming supply, and to shape the average current waveform to match the incoming supply voltage waveform so that the power factor drawn is close to unity. However (see FIG. 1) such prior art designs presently use a hard switched transistor device T1 to connect the boost inductor L1 periodically to the negative end of the input full wave rectifier bridge and build up a current in this inductor then switch the transistor T1 off so that the current flowing in the inductor then charges the storage capacitor C2 to a higher voltage. The rectified average current drawn from the line is measured in a small resistance R3 and compared against a proportion of the rectified input supply voltage at the junction of R1 and R2.

As switching is done at a frequency substantially higher than the incoming supply frequency the current waveform can be made to average out to match the supply waveform. Many integrated circuit control schemes exist to provide these functions. There are several modes of operation, where the current may be continuous through the inductor, or discontinuous, or critical where the switching on of T1 is done at the instant that the current through the inductance reaches zero. However all modes have an undesirable effect in that the switching of the transistor should be fast to minimise switching loss (where the device momentarily supports both voltage across it and current through it) and this results in Electromagnetic Interference (EMI) occurring which must be suppressed and filtered so that it cannot conduct onto the supply lines or radiate out into the surroundings.

In addition to dissipative snubber circuits (transient voltage suppressers) across the switching device and/or boost diode, this usually requires a relatively complex and expensive EMI filter to be interposed between the AC supply and the device, and often the provision of metallic screening around it. The output of such a boost converter is high voltage DC which can then be used in a load resistance as shown or be converted to low voltage high current output as desired using any one of several well-known DC-DC converter circuits, and which can add their own EMI component.

A method of zero voltage switching has been proposed (U.S. Pat. No. 5,180,964) for a DC-DC boost converter (FIG. 2) which provides this zero voltage switching function, however this has been employed only for a simple DC-DC boost converter and not in power factor control of an AC supply, and has some disadvantages. In FIG. 2 the addition of current sensing means to detect the zero current in the inductor L1 by a secondary winding L2 on L1 requires an isolated, but well coupled winding which adds to cost and winding difficulty.

BRIEF SUMMARY OF THE INVENTION

According to a first aspect of the present invention there is provided a method of zero voltage switching for power factor control, the method comprising the steps of:
  (a) providing a capacitor in parallel with a switching device;
  (b) detecting the polarity of the current through the capacitor; and
  (c) operating the switch responsive to a change in the polarity of the current through the capacitor.

Preferably, the method further comprises the step of altering the peak current in the switching device responsive to a comparison between an output voltage or current from a storage capacitor and a reference voltage or current.

Preferably, the method further comprises the step of supplying one or more components of a system employing the method with current from the capacitor.

In a particular embodiment of the first aspect, there is provided a method of semi-resonant switching (for electrical power conversion and regulation from an unregulated voltage supply) incorporating a storage inductor connected to a switch with a parallel connected resonating capacitor and series connected capacitor current sensing means such a resistor, diodes or current transformer, together with output rectifier or synchronous rectifier, output storage capacitor and feedback means for regulating the output voltage or current which are compared with a voltage or current reference to give an error which alters the peak current in the switching device, by sensing the optimum switching point of such switching device so that switching occurs at close to zero voltage across the switching device on both on and off modes from the change in direction of current flowing in such shunt resonating capacitor connected across the switching device, measured by a level sensing device such as a comparator, operational amplifier or transistor, resulting in very low switching losses and electromagnetic interference, the current through the resonating capacitor optionally being also usable to supply the control circuits or other circuitry at very low power loss, such switching action applicable but not limited to a range of switching power supplies from mains power factor controllers, DC-DC converters electronic bulbs such as those containing LED's, solar power converters and the like.

According to a second aspect of the present invention, there is provided a power factor controller comprising:
  a capacitor in parallel with a switching device; and
  a level sensing device configured to sense the polarity of current passing through the capacitor;
  wherein the switching device is operated responsive to a change in the polarity of the current through the capacitor.

Preferably, the power factor controller further comprises a storage capacitor and wherein the peak current in the switching device is altered responsive to a comparison between an output voltage or current from the storage capacitor and a reference voltage or current.

Preferably, the power factor controller further comprises control circuitry supplied with current from the capacitor.

Preferably, the power factor controller is supplied by a mains supply and outputs a controlled DC voltage at a level higher than the peak of the mains supply or a controlled current from said higher voltage.

In a particular embodiment of the second aspect, there is provided a self-oscillating semi-resonant general purpose power factor controller regulator supplied by a mains supply connected to a full-wave bridge rectifier means supplying the unregulated Dc voltage to the regulator using the semi-resonant switching method of the first aspect to switch the switching device optimally at close to zero voltage and where the output is a controlled DC voltage at a level higher than the peak of the mains supply or a controlled current from said higher voltage, resulting in a high power factor load close to unity on the mains supply at much reduced power loss and electromagnetic interference, the supply voltage for the control circuitry being optionally provided from the current through the resonating capacitor via series connected rectifier diodes at very low loss, such resonating capacitor being optionally split into two or more paralleled devices so that the optimum size of capacitor can be employed for both the optimum resonant action and the internal supply and zero voltage sensing detection.

Preferably, the power factor controller further comprises a transformer and a rectifier, the transformer isolating an output voltage or current from an input supply.

In a particular embodiment, there is provided a self-oscillating semi-resonant power factor controller regulator which has a semi-regulated DC output voltage which may be higher or lower than the mains, or a semi-regulated DC current, either of which is isolated from the main supply input by a transformer with substantial leakage inductance followed by a rectifier or synchronous rectifier and storage capacitor together with feedback and comparison means and without an extra DC-DC converter regulating stage.

Preferably, the power factor controller further comprises a DC-DC converter, the DC-DC converter comprising a second capacitor in parallel with a second switching device, and a second level sensing device configured to sense the polarity of current passing through the second capacitor, wherein the second switching device is operated responsive to a change in the polarity of the current through the second capacitor.

In a particular embodiment, there is provided a self-oscillating semi-resonant power factor controller with a second self-oscillating semi-resonant DC-DC converter and regulator utilising a second but similar zero-voltage switching method as described in claim 1 incorporating a second storage inductor, switching device and semi-resonating capacitor, rectifier and storage capacitor resulting in a closely regulated second output voltage or current with very high overall efficiency and low electromagnetic interference.

Preferably, the power factor controller further comprises one or more LEDs powered by the DC voltage output, the number of LEDs selected such that the total voltage drop across the LEDs is higher than a peak voltage of the mains supply.

Preferably, the power factor controller further comprises one or more cooling pads or fins in thermal contact with the one or more LEDs for cooling thereof.

Preferably, the power factor controller further comprises a thermistor thermally connected to one or more cooling pads or films so as to measure the temperature of one or more of the LEDs, the power factor controller further adapted to control current dependent on the temperature.

In a particular embodiment, there is provided a semi-resonant power factor controller where the load is a controlled current supplying a plurality of LED's connected in series from the positive of the high voltage supply to the negative of the high voltage supply via a series connected current sensing resistor such that the combination provides a light bulb with controllable light output, the number of relatively low current LED's being such that the total voltage drop across them is always higher than the peak voltage of the supply so that the LED's do not pass current at normal peak voltage input of the mains without the regulator functioning, and such relatively low current producing such low power loss in the LED's that the cooling of the LED's may be sufficiently good by conduction through small copper pads or small copper fins to which these are soldered resulting both in very light weight due to the elimination of bulky and heavy heatsinks and very long life of said LED's.

According to a third aspect of the present invention there is provided an LED light source comprising one or more LEDs and the power factor controller of the second aspect.

Preferably, the LED light source further comprises one or more high brightness LEDs and one or more cooling devices configured to cool the LEDs.

In a particular embodiment, there is provided a LED light bulb or light source supplied at a controlled current by a semi-resonant power factor controller regulator in which a plurality of higher current higher brightness LED's may be used for much higher light outputs where these LED's can be effectively cooled.

Preferably, the LED light source further comprises a light sensor configured to measure ambient light levels and a regulator circuit configured to adjust the output of the one or more LEDs responsive to the ambient light levels.

Preferably, the light sensor comprises a variably occluded phototransistor.

In a particular embodiment, there is provided a LED light bulb which incorporates a variably occluded phototransistor sensing ambient light levels from the rear of the bulb feeding a signal into the bulb regulator circuitry to adjust the light output of the LED's automatically in response to ambient light levels or disable such automatic operation, such occluding device being a manually variable vane or tapering slot or similar providing varying sensitivity to ambient light such that by adjusting the occluding means the user can choose an overall light level to be maintained, thus saving energy.

Preferably, the LED light source further comprises a current sensor and a controller configured to control a holding current of an external dimmer switch by comparing input current to a reference and selectively driving a load on or off to take more or less current, respectively, from the dimmer switch responsive to a difference between the input current and the reference.

In a particular embodiment, there is provided a LED light bulb incorporating additional circuitry whereby the bulb may be dimmed without flicker by an external wall dimmer switch incorporating a triac, thyristor or transistor means, such additional circuitry comprising current sensing means such as an operational amplifier comparing the current flow into the bulb with a current reference to ensure the maintenance of the holding current of such a dimmer switch by adding current taken from the supply to the bulb by linearly driving on or off a second transistor and additional resistor load so that the total current taken exceeds the holding current of the dimmer switch, such current therefore being taken only as necessary to maximise the efficiency of the bulb.

Preferably, the LED light source further comprises one or more resistances and a controller configured to selectively switch in said one or more resistances to limit inrush current on determination of the action of an external dimmer switch.

In a particular embodiment there is provided a LED light bulb incorporating additional circuitry whereby the bulb may be dimmed without flicker by an external wall dimmer switch incorporating a triac, thyristor or transistor means, such additional circuitry being enabled to switch in series resistance into the bulb input to limit inrush current by means of a switch or tertiary switching transistor in turn controlled by a fourth transistor driven by a capacitor and series resistor network sensitive to high rates of rise of voltage appearing across the added series resistance, so that the tertiary transistor is turned off momentarily to limit the current to that flowing in the series resistor, thus acting only as necessary when otherwise a high peak of current would flow, and thus damp resonances caused by the filter usually fitted to such dimmer switches acting together with any filter or reactive components within the light bulb which might otherwise cause the dimmer switch to turn off, the resistance automatically being switched out by the parallel connected tertiary transistor when not required to maximise the efficiency of the bulb.

Preferably, the LED light source further comprises a capacitive sensor configured to alter the brightness of the output of the one or more LEDs responsive to a determination of proximity of a moving person or conductive object in the vicinity of the LED light source.

Preferably, the capacitive sensor comprises a capacitance-sensitive oscillator connected to a phase-locked loop and a voltage sensor configured to detect changes in a voltage of the phase-locked loop, the capacitive sensor configured to control the power factor controller so as to alter the brightness of the one or more LEDs.

In a particular embodiment there is provided a LED bulb incorporating highly sensitive capacitance sensing means to brighten or dim the bulb in the proximity or absence of a moving person or conductive object, such capacitive sensing means comprising a capacitance-sensitive oscillator connected to a phase-locked loop so that whilst ignoring very slow changes caused by ambient variations a more quickly varying external capacitance caused by movement of a conductive object such as a person will cause the oscillator frequency to change sufficiently to cause in a change in the DC voltage which locks the loop, such change in voltage being sensed either from that DC value or the signal from a second phase detector output in the phase locked loop and the changes detected by an amplifier and band-pass filter and comparator or other voltage level sensing device which then feeds a signal into the bulb regulator to allow the bulb to be lit when in the presence of a moving person or conductive object such as a vehicle nearby, or dimmed slowly or after a delay when in the absence of such a moving object, to save energy.

Preferably, the capacitive sensor is configured to compare a trend of detected capacitance changes with a detected capacitance change, and selectively control the brightness of the one or more LEDs dependent on the comparison.

Optionally, the capacitive sensor comprises a capacitance to digital converter and a microcontroller, the microcontroller configured to carry out the comparison on signals from the capacitance to digital converter.

In a particular embodiment there is provided a LED bulb incorporating ultra-sensitive capacitance sensing means to brighten or dim the bulb in the proximity or absence of a moving person or conductive object, such capacitive sensing means comprising a capacitance to digital converter device and a micro-controller to compare the trend of capacitance changes such that slow changes are ignored but a moving person or object such as a vehicle can be detected at longer range and feed a signal into the regulator for the bulb so that the bulb is lit or dimmed slowly or after a delay as required after the disturbance has passed to save energy, such a bulb being ideally suited to high ceilings or street or path lighting.

Preferably, the capacitive sensor comprises first and second spaced conductive panels, the first or the second conductive panel connected to a safety capacitor whereby the capacitive sensor is sensitive to changes in capacitance on the same side of the LED light source as the other conductive panel.

Preferably, the first and second spaced conductive panels are mechanically reversible such that the capacitive sensor may be made sensitive to changes on the other side of the LED light source.

In a particular embodiment the capacitance providing the sensing means comprises two parallel or conically parallel conductive plates or meshes separated by an insulator or air gap such that the first plate is attached to the local sensing circuit common ground in the bulb or by means of a safety capacitor and a second plate is connected to the sensing input also by a safety capacitor, such that the sensing second plate is screened from changes in capacitance on the side with the first grounded plate so that it has sensitivity to movement only on the second sensing side, the area and distance of the plates from each other setting the sensitivity and range of the movement detection, such plates being mechanically reversible so that the sensitivity can be on one or the opposite side of the bulb.

According to a fourth aspect of the present invention there is provided a boost converter comprising;
 a capacitor in parallel with a switching device; and
 a level sensing device configured to sense the polarity of current passing through the capacitor;
 wherein the switching device is operated responsive to a change in the polarity of the current through the capacitor.

According to a fifth aspect of the present invention there is provided a power source comprising the boost converter of the fourth aspect and one or more photovoltaic cells providing a supply to the boost converter.

Preferably, the power source further comprises a storage battery, the power source configured to charge the storage battery with an output from the boost converter.

In a particular embodiment there is provided a semi-resonant boost converter regulator where the supply is variable DC voltage and current from a solar cell or plurality of solar cells, and the output is a regulated DC voltage at a higher voltage either to provide more suitable and regulated power, charge a storage battery or return energy to the mains, the much high efficiency resulting from the zero switching method being of great importance to the viability of such solar installations.

Preferably, the power source further comprises a controller configured to periodically turn off the boost converter and sample the open circuit voltage of at least one of the photovoltaic cells, the controller further configured to adjust a load of the boost converter such that when the boost converter is turned on the output power from the photovoltaic cells is maximised.

Preferably, the load is adjusted such that the power source operates with a closed circuit voltage between 80-84% of the open circuit voltage.

Preferably, the closed circuit voltage is dithered between 80% and 84% of the open circuit voltage.

In a particular embodiment there is provided a semi-resonant boost converter regulator where the output of the solar cells is maximised by a tracking method to run such cells at their maximum power point, such maximisation provided by frequently but briefly turning off the converter and then sampling the open circuit voltage of the cell on a very low mark to space ratio, establishing the percentage of that open circuit voltage where the maximum power will be generated, being of the order of 80-84 percent of the sensed open circuit voltage, and adjusting the load by means of reducing or increasing the output of the converter so that power is taken from the cells at close to that optimum power which creates a voltage across a capacitor connected in parallel with the solar cells so that for the cell at any given level of insolation the capacitor charges and discharges around that optimal voltage point as the regulator draws current from the paralleled cells and capacitor, whether during different levels of sunlight during the course of the day or due to temporary shading which might occur due to many reasons such as clouds or tree branches.

These and other objects and features of the present invention will become more fully apparent from the following description and appended claims, or may be learned by the practice of the invention as set forth hereinafter.

BRIEF DESCRIPTION OF THE DRAWINGS

The present invention will now be described by way of example only and with reference to the accompanying figures in which:

FIG. 5 illustrates in schematic form an LED lamp with an occluding shutter, in accordance with an aspect of the present invention;

DETAILED DESCRIPTION OF THE PREFERRED EMBODIMENTS

Figure 2:
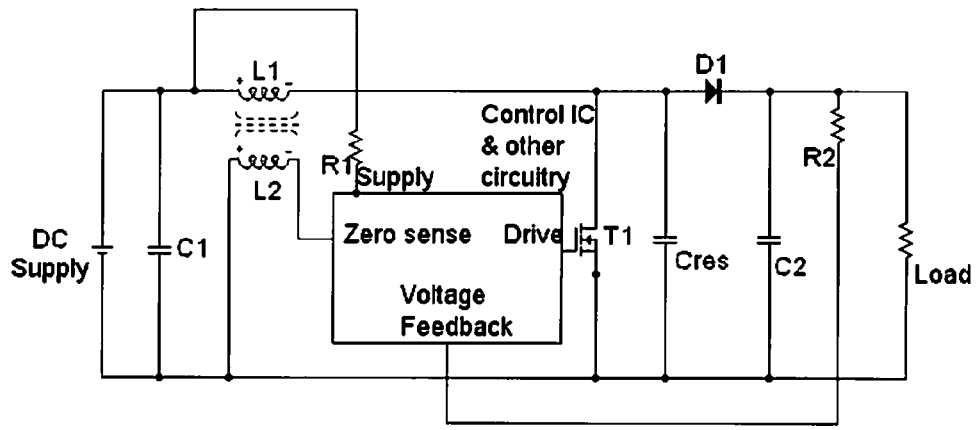
FIG. 2 illustrates in schematic form a DC-DC boost converter comprised in the state of the art.

One solution to the problems posed by the limitations of the prior art proposed in this application is a power factor control scheme using an extra 'semi-resonating' capacitor such as in the simple boost DC-DC converter of FIG. 2 but in this case the input is not DC but a full-wave rectified sine wave, and the zero-voltage switching point is controlled by sensing the current through this capacitor and not by such an additional winding. A further advantage of this new design is that, outwith the start-up period, the supply for the control electronics is available from the extra 'resonant' capacitor which minimises components and the extra power dissipation, should the supply be taken direct from the high voltage rectified input. In addition the controlled current required for controlling the brightness of a series connected light emitting diode (LED) load is then able to be taken from the boost capacitor directly. This results in a much improved efficiency which can exceed 96% depending on the choice of components, and almost zero EMI signature, both extremely desirable for general purpose Power factor control and also for LED lighting, where large quantities of lamps may be present in an office or other large installation each adding its proportion of EMI and inefficiency and potentially at a relatively poor power factor.

Figure 3:
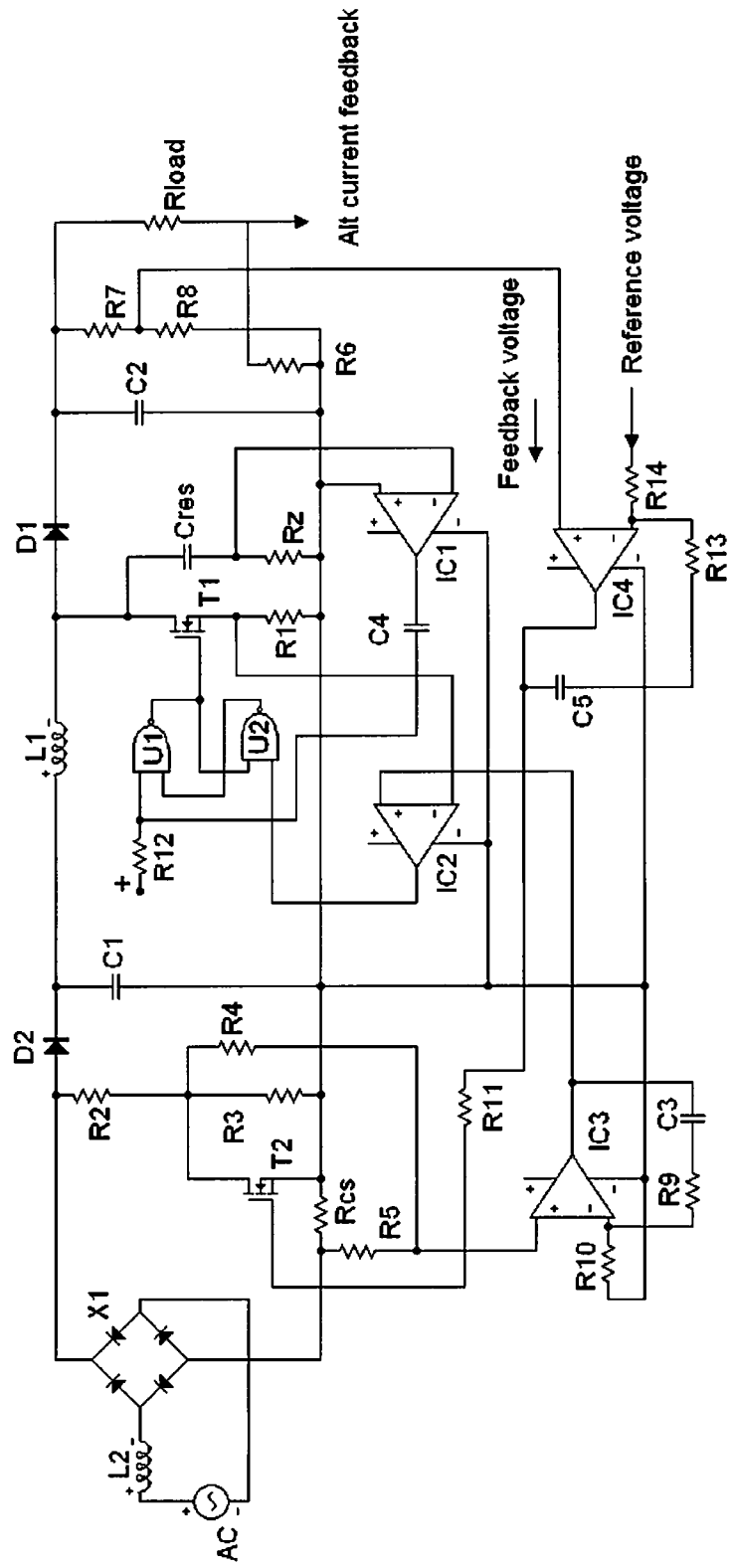
FIG. 3 illustrates in schematic form a power factor control scheme, in accordance with an aspect of the present invention.

FIG. 3 shows the basic improved power factor control scheme. It is basically similar to the conventional boost circuit but in this circuit there is a resonating capacitor Cres which has a low value series resistor Rz at its low voltage end for measuring the current through it. T1 is initially switched on at close to zero supply volts by a secondary start-up circuit, which forces U1 output high momentarily and drives T1 on until the self-oscillating state is in operation. It is disabled as soon as the converter is running continuously. When the current through mosfet, bipolar transistor or IGBT T1 (and therefore L1) measured in T1 current sense resistor R1 reaches a level set by the power factor control amplifier IC3 on the non-inverting input of comparator IC2 causing its output to go low, U2 output switches high and with two high states on U1 inputs that switches its output low and T1 switches off. The current through L1 is then initially diverted to flow through Cres, until this has charged to the level of the storage capacitor C2 plus the diode drop of D1. So at the instant of switch off T1 is switched off completely with virtually zero volts across it, resulting in virtually zero switch-off power loss. As L1 continues discharging into C2, charging it up via D1, and drops to zero current when fully discharged, the voltage on Cres is then higher than the supply across C1 so current then reverses through L1 until Cres is discharged back towards whatever the supply voltage may be at that instant in the mains cycle; in fact the two components effectively 'resonate' together for about a quarter of a cycle such that the current in Cres flows negatively for a brief spell, then starts to flow positively again. During this period the boost diode D1 also recovers softly, without generating any appreciable switching noise as it does in the prior art. The change from negative to positive flow of current is detected in Rz by a fast voltage comparator with a zero voltage reference, which triggers the switch on of T1 again via the set/reset flip-flop comprising U1 and U2. This switch on occurs while current is flowing through the reverse body diode of the FET, (or through an additional reverse connected diode if a bipolar or IGBT transistor is used), resulting in virtually zero switch on power loss. It is advantageous for the mosfet to be switched on even with negative current flow through it, as often the voltage drop across its on-state resistance is less than that of the body diode, thus saving even more power. (Note that the NAND flip flop can easily be replaced by those skilled in the art with a dedicated flip-flop such as a NOR R-S, D-type or J-K type; in this case the choice of two NAND Schmidt triggers is simply made by being able to use the components in the IC package for U3 and U4 as well. Such a modification is demonstrated in FIGS. 7b,c,d and e.)

The cycle repeats itself automatically at a widely varying high frequency throughout each half cycle of the AC supply, charging up C2 to either a controlled voltage or to such a value of voltage that current through a series connected LED string supplied by C2 reaches the design target. This varying switching frequency is thus 'spread spectrum' and therefore contributes only a very small amount of non-harmonic noise to the mains current. It also minimises any mechanical noise due to magneto-striction in either the L1 inductor or piezo effects in Cres. The very small amount of electrical switching noise on C1 is further filtered by a small series inductor L2 in one of the input lines. The voltage proportional to the full-wave rectified current drawn by the converter is measured across Rcs and summed in amplifier IC1 with a proportion of the voltage from the full-wave rectified mains supply voltage such that if the current is less than the voltage signal the amplifier increases the current reference to increase the current to match the voltage, and conversely decrease the current should it be higher. Thus the average current is controlled to match the input waveform over each half cycle, giving a power factor close to unity; 0.985 is achievable. Some filtering around IC1 by means of R9,10 and C3 controls the loop stability and ensures the circuit responds to the mains input frequency and not the switching frequency.

Figure 1:
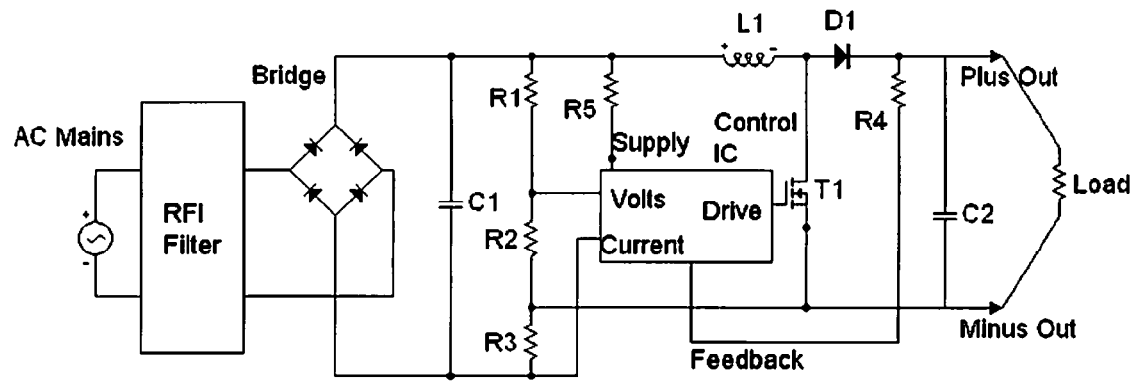
FIG. 1 illustrates in schematic form a power factor control system comprised in the state of the art.

The value of Cres is chosen to minimise slew rate sufficiently so that interference is negligibly low without having to add more complex Electromagnetic Interference (EMI) filters in series with one or both supply lines, or be concerned about the high slew rates or ringing caused by the circuit in FIG. 1 coupling into heatsinks or out through the air. Thus power factor correction units employing this design can be run with minimum screening or filtering, at much higher efficiency than previous designs. This is especially important in an LED bulb as the lack of grounding and the plastic casing means they cannot easily be screened. The current through Cres can also be used to provide a low-loss supply for the control electronics by replacing the zero current sensing resistor Rz by a diode charge pump assembly. This shown in more detail in FIG. 4. D3 is used to detect the current zero as the voltage across it changes quickly from negative to positive at that point, making it easy for the comparator to detect this condition. The positive current appearing when T1 is switched off and Cres is charging is diverted by D4 into a smoothing capacitor C8 which when proportioned correctly provides a voltage sufficient to power the circuitry and gate drive. In fact gate drive is minimised at switch on because the voltage across T1 is zero and therefore the Miller capacitance coupling of Mosfet Drain dV/dT current to gate is negligible. There is no need to drive the gate on with a fast high peak current as would be the case with hard switching in FIG. 1. In fact this also helps to reduce any EMI which might occur due to fast gate pulses. The switch off is also at zero drain voltage but here the drive is desirably somewhat faster as it minimises the voltage rise reached across T1 as Cres charges during the switch-off period, maximising efficiency. Should the optimal value of Cres require to be larger than the power supply requirement, for example in higher power applications, it can conveniently be split into two parallel devices, such that the power supply and zero current detection capacitor can be sized appropriately. The initial start up supply required is provided by a simple NPN emitter follower or mosfet T3 and is switched off by T4 once the current flow from the Cres and diode charge pump D4 is sufficient to break over the zener diode Z1, which initially controls the supply voltage at the value of the zener break over voltage plus the base-emitter voltage of T4 thus reducing the power supply dissipation in T3 to a very low value. In general, depending on the selection of the IC's used in the circuit the supply current actually required is very small and can be just a few 100 micro amps leading to exceptionally low standing power loss.

The voltage across the storage capacitor C2 (or optionally the current through the LED string fed from C2) is controlled by an operational amplifier integrator which compares these target values against a reference in IC4 and adjusts the level of the attenuated full-wave rectified sense voltage at the junction of R2,3,4 summed through R4 against the full-wave rectified current appearing in Rcs via R5 by means of IC3. As the load increases or decreases, causing the target voltage or current to be less than or more than the desired level, the integrator turns on an NPN or mosfet transistor T2 either less or more than before, thus changing the attenuation of the sensed voltage appearing at the junction of R2,3,4. The summing amplifier IC3 thus adjusts the level of the peak current in T1 drain measured in R1 by means of changing the peak current reference to IC2 and returns the actual value to the target level, without distorting the sine wave current waveform appreciably from the original mains voltage wave shape. A power factor of greater than 0.985 is easily achieved. A secondary voltage limiting circuit comprising R22, 23 and Q2 compares the voltage on C2 against the regulated supply rail '+' ensures that the voltage on C2 cannot rise to unsafe levels such as might cause damage to C2, T1 or D1, should the load be reduced or open circuited abruptly. This simply turns off Q2 should the voltage rise to excessive levels and disables both the start up and current control in such a way as to prevent the circuit switching at all until the voltage falls to a safe level. Thus the circuit will operate in burst or hiccup mode at the maximum safe voltage setting until the load is restored.

Figure 4:
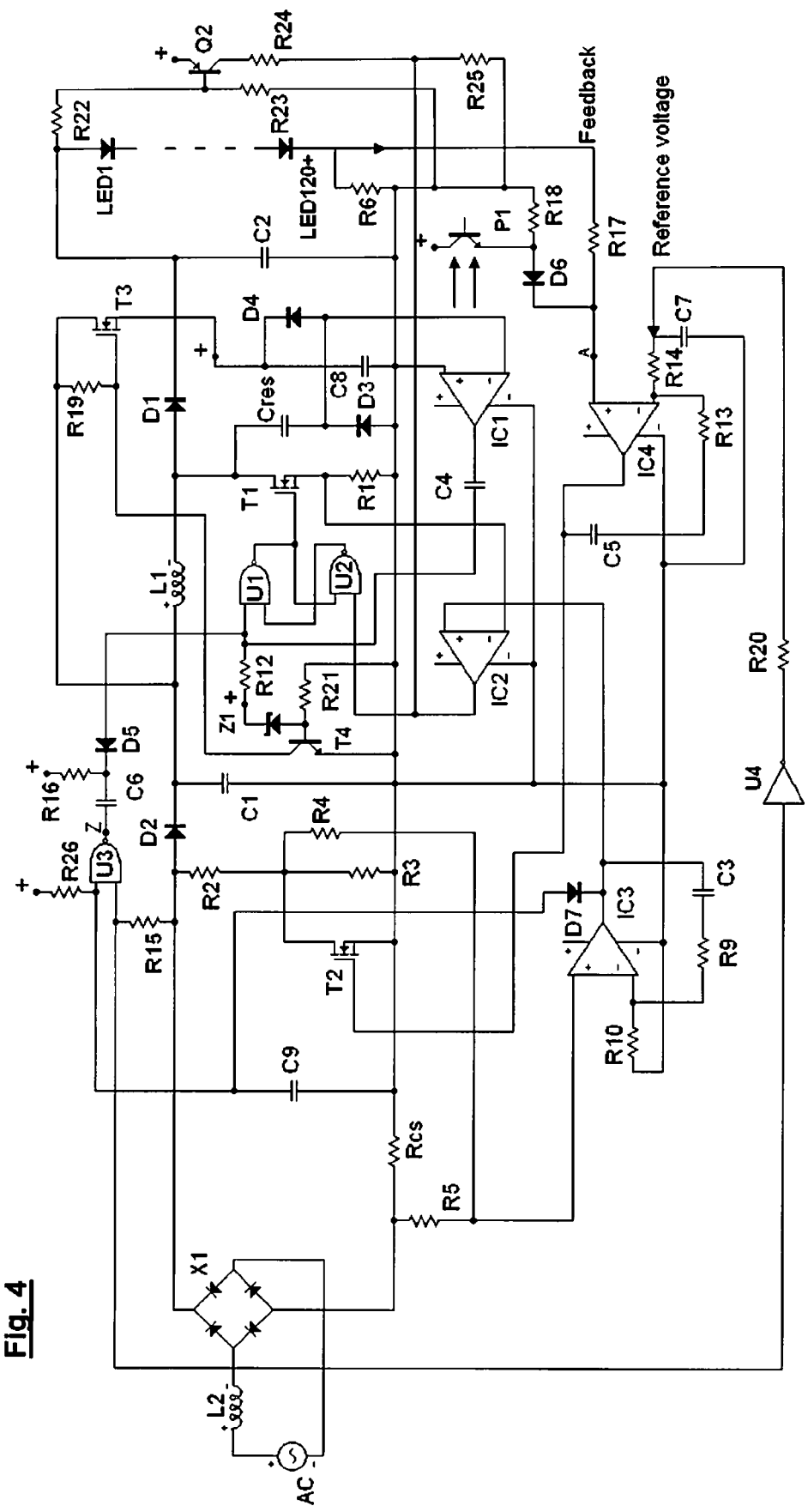
FIG. 4 illustrates in schematic form an LED lamp embodying the power factor control scheme similar to that shown in FIG. 3, in accordance with an aspect of the present invention.

FIG. 4 shows one implementation of an LED lamp using this technique. The circuit is basically the same as the general purpose circuit from FIG. 3, with some minor additions. It is designed to provide current to a string of series connected LED's for which the total forward voltage must be substantially higher than the peak voltage from the AC supply, so that the LED's do not conduct without the boost converter running. This allows very long strings of low current LED's to be used and this string can incorporate LED's of differing colours to add to the white colour to balance it for better colour temperature and colour rendering. It is a fact that LED's which emit light at lower colour temperatures are much less efficient that those which emit high in the blue spectrum, so adding a certain number of red and even some green or cyan gives a much more efficient light output with better colour rendering. In addition to this the cooling of the LED's can be made very simple by just the copper land around each device and/or small copper solder tags rather than the mechanical and weight difficulty of extracting heat from so-called high brightness higher power LED's.

Instead of using Rz in FIG. 3 in series with the resonating capacitor this is replaced by the two diodes D3 and D4 such that the negative current flow through D3 flows to ground whilst the positive current flows to the power supply via D4 for the control circuit. The reference voltage in this case is taken from the output of an inverter gate U4 via a filter R20 and C7 which allows the average reference voltage at the inverting input to IC4 to be reduced approximately with the phase angle when a phase control dimming waveform is applied to the supply terminals instead of a regular mains sine wave. The threshold of this gate is only a few volts so the mark-space ratio of the output of U4 reduces from close to 100% at 100% conduction as the phase angle of the mains supply is reduced, thus reducing the reference voltage and therefore the running current of the LED string. Thus the bulb dims in response to the phase angle but because the voltage on C2 is smoothed there is still no flicker, right down to close to zero conduction angle. This allows both forward and reverse phase-cut dimmer types to be utilised. Note that this LED bulb circuit can be scaled from low power (equivalent to 25 or 40 watt bulbs through to 60 W, 100 W or higher incandescents) to even higher power where the small LED's are replaced by larger high brightness LED's still connected in a long series chain but run at higher current. In the latter case of course the cooling for these devices no longer can employ simply PCB track copper but requires to be achieved via metal clad PCB material, Heat pipes or other heat sinking means.

One important aspect of dimming requiring to be addressed with conventional phase cut dimmer is the difficulty of maintaining the holding current of the triac (or thyristor) switches which are usually employed, in low powered bulbs. Such dimmers are usually designed to operate on resistive incandescent lamp loads from perhaps 60 watts to many hundreds of watts, and under such conditions the current is obviously much higher than for an equivalent LED bulb, which for the design described above may draw just 9.6 watts or less for an equivalent lumen output to that of the 60 W bulb. It is known that the triac device will turn off should its holding current drop below its limit. This can occur just because the current taken by the bulb is so low that it cannot maintain the holding current of the triac at either the beginning or end of each half-cycle where the supply sine wave voltage is low, or by a lesser known effect due to local ringing of the filter often fitted to the dimmer to suppress EMI from the switching action of the triac. This latter effect is caused by the addition of a shunt EMI suppression capacitor in parallel with the dimmer. The triac often has a series inductor in its high terminal, and when the triac is triggered on, this capacitor is discharged through the triac and inductor causing a local high frequency ring in this loop which is not seen by the external circuit. When an incandescent lamp load is used the ringing quickly decrements to a very small amplitude by the damping effect of the resistance of the bulb, but in an LED bulb the impedance of the bulb is so much higher that the ring can continue for several periods of the resonant frequency at quite high amplitude, and after the initial inrush current of the bulb to charge the internal capacitors the current in the triac (which is the sum of the LED bulb current and the ringing or resonant current), can still drop below the holding current even although the current taken by the bulb is greater than the holding current, and even reverse the current through the triac, turning it off. In either case the action of the triac switching off can affect the timing of its triggering circuit and/or the reference voltage measured by the LED bulb's sensing circuit, and cause unacceptable flicker in the light output. In addition it is desirable to limit the inrush current at the start of each cycle of triac conduction, not only for the peak currents involved but as this adds to the ringing amplitude described previously. This can be done with some extra resistance in series with the main supply to the bulb, but such resistance results in losses and an undesirable reduction in efficiency.

Figure 4A:
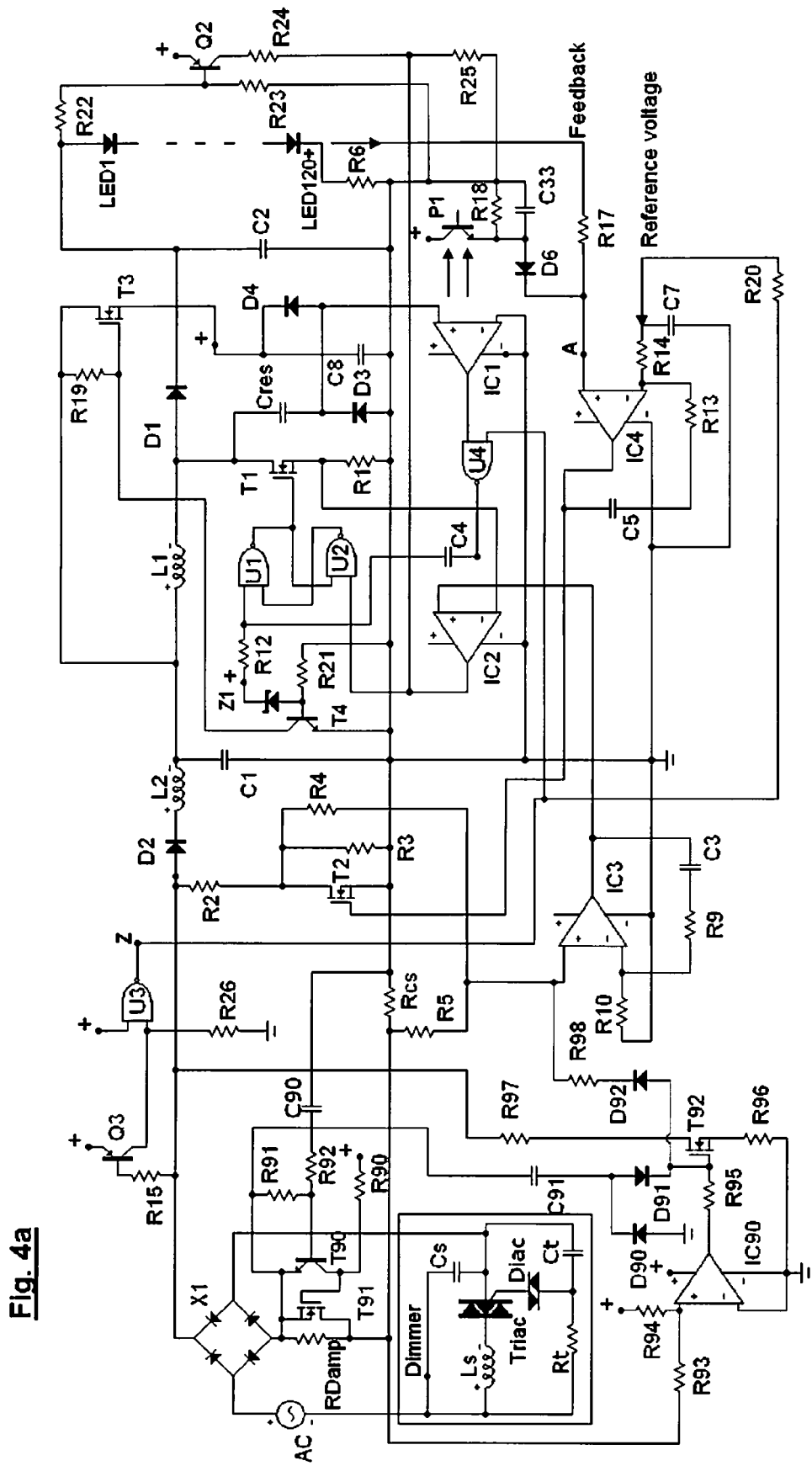

A method of mitigating these effects is shown in FIG. 4A. A basic phase control triac dimmer is shown boxed with Triac, gate drive diac, timing components Ct and Rt (which would normally be a potentiometer or rheostat) and EMI suppression filter Ls and Cs. These last two parts are the cause of ringing which can turn off the triac as previously mentioned. The additions to work with a dimmer are those parts numbered from 90 up. An inrush limiting series resistor RDamp is connected at the negative end of the full-wave rectifier bridge between that and Rcs, but this is bypassed by a small mosfet T91 unless the current in it is fast rising, in which case it is turned off momentarily by then turn on of the gate-source transistor T90 due to the AC coupling via R92 and C90, until the current pulse due to the charging of the internal capacitances has reduced to a low value. The gate capacitance of T91 and its high value gate resistor R90 ensure that the gate voltage rises relatively slowly and therefore the current through RDamp gradually decreases and flows through the mosfet, which has a much lower resistance when on. This saves the standing loss of Rdamp which would otherwise occur. At the same time a second small mosfet T92 it driven on via C91 and D91 such that as the inrush current falls its gate voltage rises irrespective of the output of IC, switching the resistance R97 across the output of the rectifier bridge and absorbing the ringing current and holding current from the dimmer for a brief time until the action of operational amplifier IC90 causes it to either turn off or partly on to maintain the triac's holding current. IC90 is comparing the negative voltage across the current sense resistor Rcs with a positive reference in the summing point at the junction of R93 and R94, such that if the current in Rcs is less than about 10-20 mA (a typical maximum holding current for most triacs), its output goes high enough to turn on the mosfet sufficiently to ensure 10-20 mA is drawn from the dimmer no matter what type it is. In addition to this minimum current control, a pulse and/or dc voltage is sent from the mosfet's gate voltage via D92 and R98 to override the Power factor control amplifier IC3 momentarily forcing its output high to ensure it draws current from the supply at much better efficiency so that minimum energy is wasted in the mosfet and series resistor. The main current control loop will adjust itself to reduce the current in LED's drawn by the main converter over the remainder of the half-cycle to match the phase angle of the dimmer.

This method of operation whereby a minimum current is maintained if possible by IC90 allows the LED bulb design above to work both with forward and reverse phase cut dimmers where the main control device is a transistor instead of a triac or thyristor. Such transistor devices often require an increased feed-through current to maintain their internal timing circuits and the method employed above allows for a resistive path for current to flow for this purpose.

Also in this LED lamp circuit above, a photo sensor device P1 with a variably occluding shutter is provided to allow control of the light emitted from the bulb by the strength of the ambient light measured by the sensor. It is well know that in general users of artificial light often forget to turn down or off the lighting in an office or home even though the sun may have started shining into the room and ambient light levels have increased greatly, so such an automatic function can be extremely useful in saving a considerable amount of energy which would otherwise be wasted. An amount of setting variability can be provided by progressively occluding the photo sensor from ambient light from zero to full to give different settings so that the light can be fully automatic at different sensitivities or not at all, by user's choice. Photo sensor P1 sensitive to the ambient light from the rear of the bulb sums its current with the feedback voltage from the LED current via a diode D6. A substantial capacitor C33 slows the rate of self dimming or brightening to avoid the system hunting, where it might detect the light produced by the bulb and reduce its output, resulting in a change in the P1 out put causing it to brighten back up again FIG. 5 shows one implementation of such an occluding shutter. It contains a bowtie shaped vane 2 with a decreasing occluding gap on one side and an axle 3 which clips into a slot 4 in the outside of the housing for the bulb 1 so that finger pressure on one side or another causes varying occlusion of P1 and therefore a varying degree of sensitivity. When P1 is fully occluded then the automatic operation is disabled.

Such a design with inbuilt light sensing (but without the occluding vane) is extremely useful for street lighting, where the light is turned on locally where needed without the usual centralised timed control, meaning that areas which are darker than normal, due perhaps to shading from dark clouds, trees or buildings are lit up first and areas which are brighter than normal are delayed until darkness occurs thus optimising the lighting and saving energy. The automatic dimming means that only the precise amount of energy required to light the given area is used, again saving energy. A modular approach using several LED light bulb circuits, optionally 60 or 100 W equivalents, the actual number selected to optimise the light required in a given area can be adopted saving energy. The very high efficiency means that little waste heat is generated to heat up the (usually enclosed) light fitting, and the relatively directional light from the LED's when mounted all on one side of the PCB, means that reflectors are not required, simplifying the fitting and reducing light pollution. The very high power factor of this design also adds to the advantages without the need for power factor correction capacitors or harmonic reduction as may be the case with other forms of lighting and their ballasts. Finally the extraordinarily long life potentially 80,000 hours to 70% brightness (18 years at an average of 12 hours per day) is afforded by the above mentioned method of running these small long series strings of LED's at low current and high voltage to maintain low junction temperatures, produces a huge cost saving advantage in terms of maintenance where roads and motorways may often requiring closure and special cranes etc to change bulbs. The use of very high efficiency LED's without the need for the addition of red or green LED's for very good colour rendering can improve luminous efficacy of the bulb to values in excess of 110 Lumens/watt even with current technology devices. This will further improve as the ongoing general improvement in LED performance progresses.

A further option for such LED bulbs is the ease with which proximity/occupancy sensing can be incorporated into the bulb. Often parts of an office or areas of a home can be left unoccupied for long periods whilst the lights are left on; often one switch controls an entire office. This is of course wasteful and while some methods of occupancy detection using Passive Infrared (PIR) devices can be incorporated as has been proposed in an earlier patent, a radically new form or occupancy detection is proposed here which can be easily added to the existing bulb circuitry and does not rely on a direct line of sight between the bulb and the occupants. This uses the varying capacitance due to occupant movement within a defined zone, and the circuit proposed both self-adapts to any static capacitance and yet resolves very small capacitance changes to ensure the light is on when the area is occupied. A conductive sensor area is attached by simply plugging an attachment into the sides of the bulb, and an internal capacitance sensor measures the varying capacitance and triggers the bulb to full brightness at a suitable threshold. In the absence of any movement causing a change in capacitance, the bulb is configured to dim down to a preset minimum setting after a preset time at full brightness (or the brightness set by the self-dimming circuit), and thus save energy. However the movement of anything substantial which has a degree of conductivity within the zone will immediately trigger the bulb to brighten back up to full brightness, or the brightness set by the internal phototransistor. The sensitivity is such (unlike a PIR based design) that it is unlikely to be triggered by small pets etc due to their much smaller capacitance.

Figure 9:
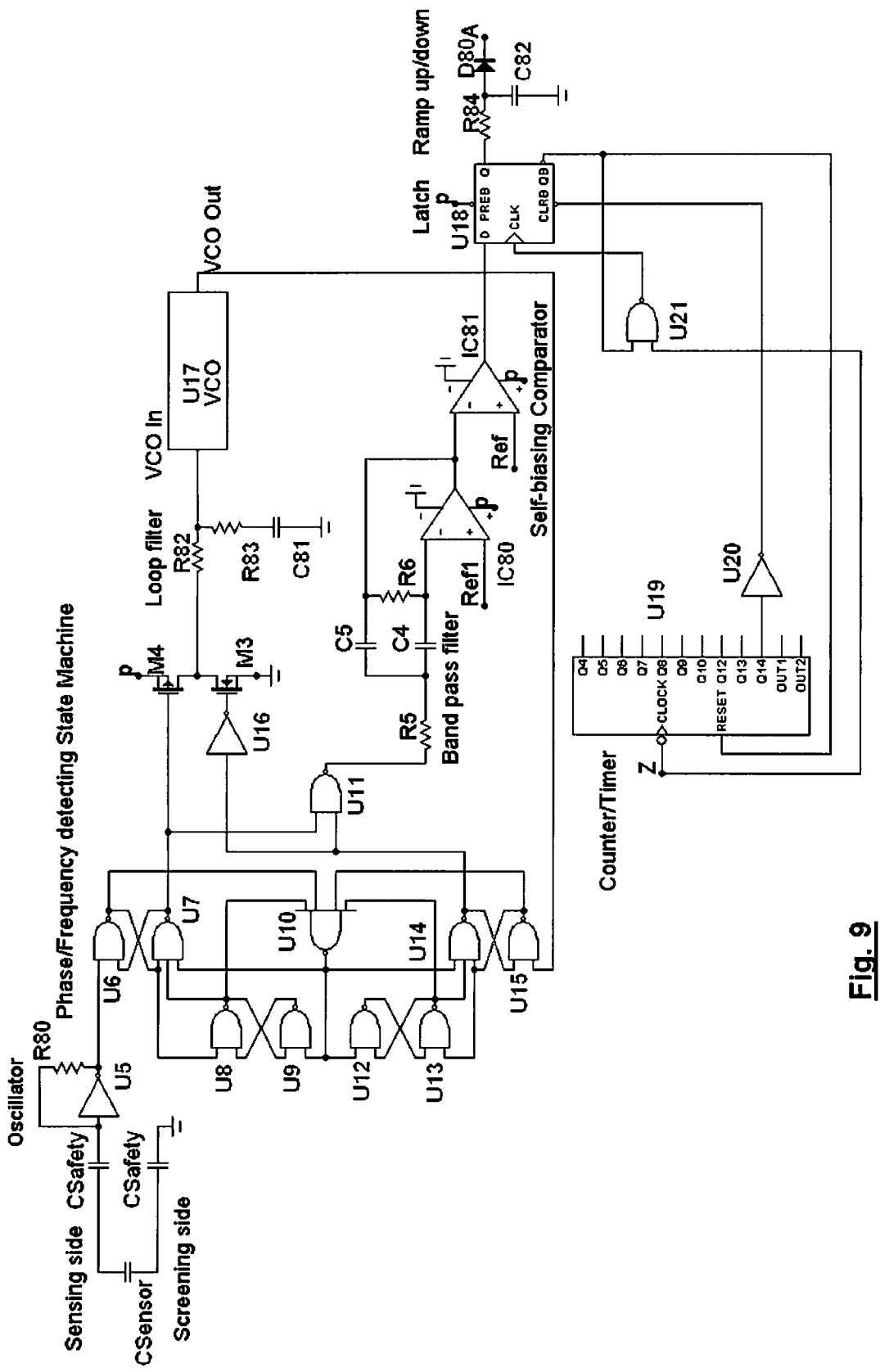
FIG. 9 illustrates in schematic form an LED lamp similar to that shown in FIG. 4 employing an occupancy detection scheme, in accordance with an aspect of the present invention.

Two methods of capacitance detection are proposed. The simplest and least expensive (but least sensitive) is to employ an oscillator and Phase Locked Loop (PLL) as shown in FIG. 9. An oscillator based on Schmidt trigger U5 runs at a frequency determined by Csensor and R80. Such oscillators are well known. A separate well regulated supply P is used to reduce and sensitivity to supply ripple and noise; this is taken from the +supply of the bulb. The output of a phase/frequency detector comprising Gates U6 through U16 in the loop controls the running frequency of a voltage-controlled oscillator (VCO) U17 such that it locks itself to the external oscillator when no movement is detected. The stability, time constant and jitter in the loop is largely control by the loop filter components R82,83 and C81. Such components as the phase detector, VCO and Phase pulse output are included in the 4046 family of Phase Locked Loops, or may optionally be constructed with discrete IC's or Gate Arrays.

If there is any change in the stray capacitance the external oscillator frequency alters and the loop then adjusts itself by a change in the voltage controlling the VCO. This change in voltage can be detected by an amplifier/band pass filter and comparator and the bulb turned on. Alternatively the phase-pulse output can be used as shown after filtering as before to give a DC voltage as a detection of changing capacitance. Normally when the loop is locked this is a small voltage but changes markedly with even a small change in phase before the loop re-acquires full lock. The output of this filter (which may be several poles for optimal sensitivity) is fed to a comparator or self biasing comparator which changes state in the event of very small changes in voltage caused by a change in capacitance due to a moving person or object. This change of state is latched by a D-flip-flop U18 and a timer U19 started. The timer and latch are clocked by an existing output Z in FIGS. 4/4a from the bulb at line frequency. The output is ramped up or down by an RC network R84, C82 and blocking diode into point A in FIGS. 4/4a of the bulb, so that it sums with the feedback from the LED current and also that of phototransistor P1. The result is that the bulb brightens in the presence of a moving occupant or other object, runs at this level for a period or until re-triggered, then if no movement is detected dims gently to a preset level set by the value of R84 and R17, thus saving energy otherwise wasted. (It should be noted that current technology for lighting such as Compact Fluorescent bulbs cannot be switched on or off effectively without a drastic reduction in their operational life.)

The capacitance of a human body to a plate 6 inches in diameter is of the order of 50 femto-farads ($10^{-15}$ Farads) at a distance of 3-4 meters. The PLL circuit can resolve to around 1 femto-farad so can easily detect movement in the 3-4 meter radius zone. However if the zone were required to be larger or the roof higher, then a dedicated capacitance to digital converter (CDC) such as the Analog Devices AD7744, and an inexpensive low power micro-controller (uC) can be used to sense capacitances down to atto-farads ($10^{-18}$ Farads). The digital output of the CDC is digitally filtered and averaged in the uC and exceptions of a defined amount can be used to trigger on the bulb as previously described. A rolling average filter will allow the uC to adjust to differing static capacitances. It can learn patterns and ignore or accept particular situations. Such a method could even be used to trigger lighting in high buildings and even street-lighting in response to the presence of people or cars in the immediate vicinity, again saving energy. The sensor plate can be made of sufficient size to detect passively over a considerable distance. However with just a simple plate it will detect on both sides, so that if fitted to a light fitting on the ceiling, for example, it could detect someone walking on the floor above. To reduce the sensitivity in such an unwanted direction a second plate slightly larger than the sensor plate and parallel to it, and connected to the ground of the external oscillator can be employed so that it not only provides the standing capacitance but screens changes in capacitance from the side where the grounded plate is fitted. A 6 inch diameter, 0.5 inch thick disc (either translucent or reflective) clipped into the bulb with the plates connected to the bulb circuitry by means of very small value safety capacitors will provide about 14 pF of capacitance to run the external oscillator. The plate might also be designed as an inverted cone which would give greater sensitivity towards the sides than simply a flat plate. Removal of the plates will easily disable the occupancy detection as the frequency of the PLL's VCO can be constrained not to rise above a certain limit. The plates can be made to be fitted reversed so that the sensitive are is on the other side, if for example the bulb was mounted in standard lamp.

Figure 6:
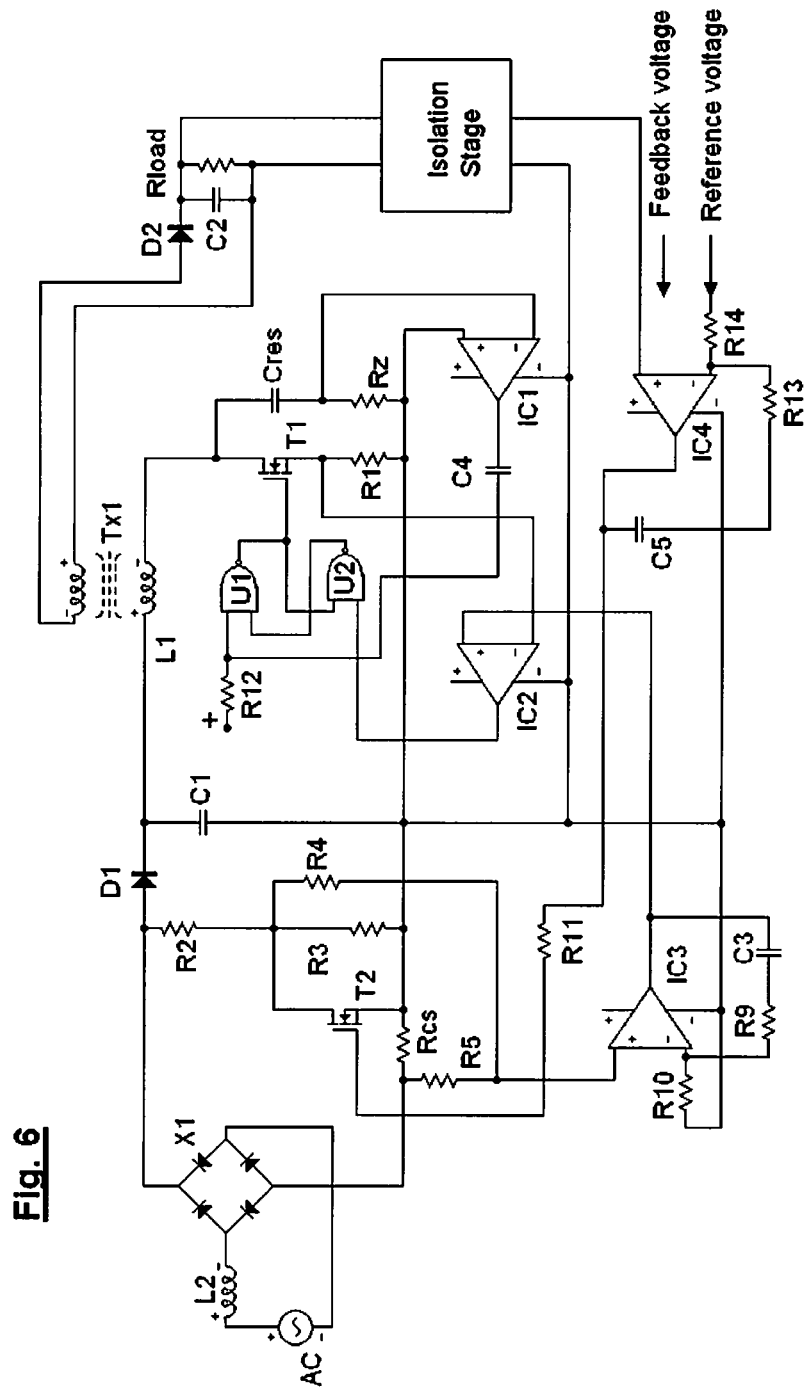
FIG. 6 illustrates in schematic form an alternative power factor control scheme, in accordance with an aspect of the present invention.

FIG. 6 shows another implementation of the semi-resonant zero voltage switched power factor controller, this time with isolation and/or voltage reduction or boost of the output voltage or current. Such a circuit might be employed to provide current to a smaller number of higher-current LED's or just as a general power factor control scheme. In this case the boost inductor L1 as utilised in the previous implementations is coupled in transformer Tx1 with a secondary winding which is connected in phase opposition with L1 so that it acts similar to a flyback converter, but with all the aforementioned advantages of zero voltage switching such as near zero switching loss and negligible EMI. The transformer does not have to be carefully wound in precise layers for low leakage inductance as would normally be required, but may be deliberately poorly coupled, as low as 90% or more, resulting in easy winding and excellent spacing of primary to secondary using high safety barriers instead of requiring extra insulating film and screens, with a high primary leakage inductance so that this semi-resonates with the Cres in the same way as before and allows zero voltage switching to take place. Alternatively the high leakage inductance may be provided by an extra inductor in series with the primary winding which simply adds the inherent unavoidable leaked inductance of the transformer. However voltages on the mosfet drain are not clamped by the storage capacitor C2 as in the previous implementations and therefore the voltage rating of T1 may require to be higher. The secondary of the transformer is rectified by a suitable diode D2 and smoothed by a filter capacitor C2, which is analogous to C2 in the previous implementation. This capacitor must be larger than normal to maintain low voltage ripple as unless the feedback loop is filtered to prevent it responding to the ripple, then small values of C2 may cause the feedback loop to correct for this ripple and this will affect the operation of the power factor control and cause distortion of the current away from the voltage referenced sine wave it should match for maximum power factor. D2 may also be replaced by a synchronously switched power mosfet to reduce the forward conduction losses in D2. Such a technique is well known to those skilled in the art. The feedback is isolated from the primary control circuit by an isolation stage which may be an opto-isolator or other means, many variations of this method are well know to those skilled in the art. It allows operation with isolated loads and when employed in lighting applications can power a lower voltage higher current LED string where this is desirable. It should be noted that each of the aforementioned circuits can be configured to operate over so-called 'universal' input voltage ranges such as from 85 to 265 Volts AC, making it possible to supply a bulb or PF correction stage which will work normally in any country.

Figure 7A:
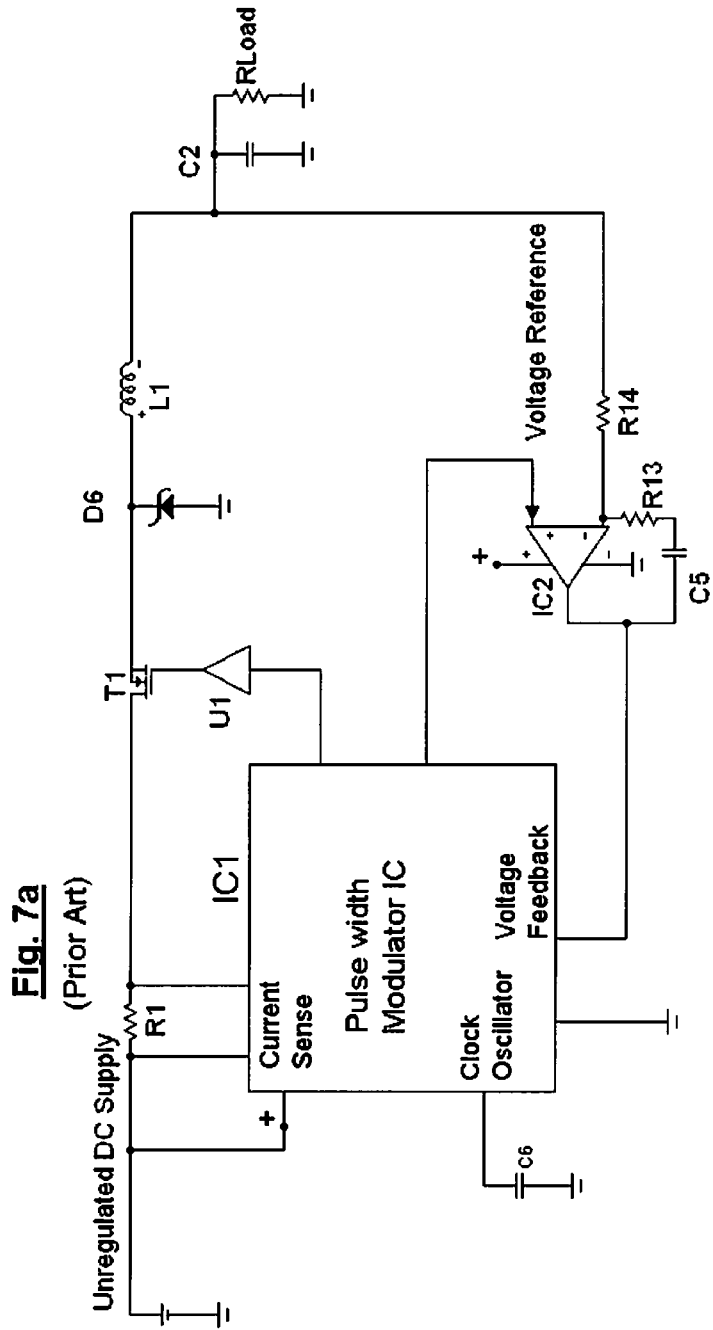
FIG. 7 illustrates in schematic form modifications to the power factor control system of FIG. 3, in accordance with an aspect of the present invention.
Figure 7B:
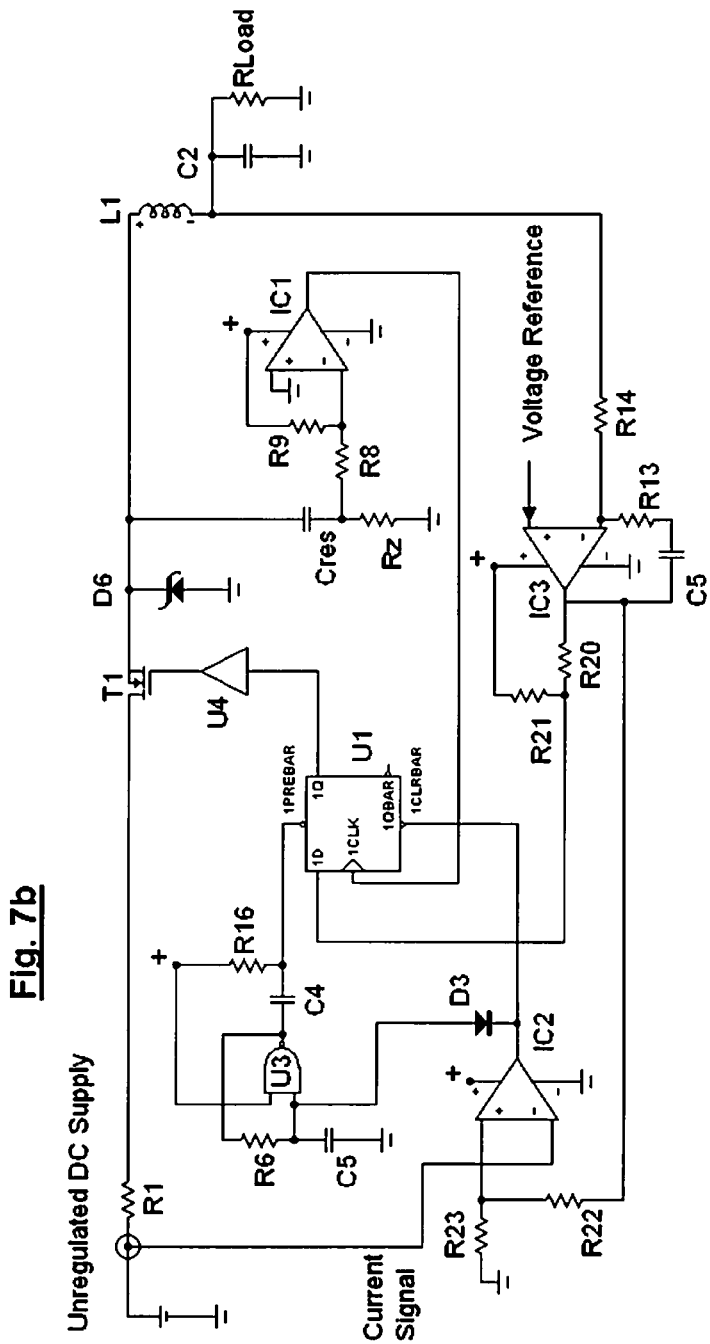

If low ripple is desirable along with fast response then a secondary buck regulator can be employed, fed from the output of the circuit in FIG. 6. This can also be designed to be semi-resonant in exactly the same way as the previous implementations to increase efficiency and reduce EMI, as shown in FIGS. 7b through e. The operations of these circuits are described as follows:

FIG. 7a shows a prior art buck converter, and FIG. 7b the improved implementation employing the semi-resonant method used in the previous circuits. In FIG. 7a there are many standard implementations of this basic buck design but all suffer from the same problems as the basic prior art power factor control circuit shown in FIG. 1, namely substantial switching losses and high frequency EMI which requires to be suppressed or filtered. The basic method of operation is to apply a pulse-width modulated drive signal often at a constant clock frequency to the gate of a power mosfet switch T1 via driver stage U1, (which may be level-shifting if an N-channel mosfet is used, or alternatively a P-channel mosfet can be employed) and average the resulting voltage at the junction of flywheel diode D6 with L1 and C2. A feedback signal is taken from the output voltage and compared against a reference voltage which controls the mark-space ratio of the drive to T1. Should the voltage be too high or too low, the controller alters the mark-space ratio to correct it. Often a current sense means such as R1 is utilised to protect T1 in the event of a n overload. There are many variations of this control method well known to those skilled in the art, and many integrated circuits available to perform this function, often including the amplifier IC1, reference and driver. And one variant is to replace D6 with a synchronously switched Mosfet with an on-resistance low enough to reduce the voltage across D6 thus reducing power loss in that device.

The circuit in FIG. 7b shows how the zero-voltage switching method is implemented to reduce switching losses and EMI close to zero and increase efficiency of a buck regulator. Just as in the previous power factor control designs a semi-resonant capacitor Cres is connected across the flywheel diode D6. A start-up circuit comprising Schmidt trigger U3 and R6 and C5 applies a brief negative going pulse to a flip-flop, which is by way of example shown as a well-know D-type device although a S_R flip-flop as shown in the previous examples could be used. This applies a high condition to the Q output and via a gate driver IC U4 to the gate of the mosfet T1. T1 turns on and current increases through L1 and current sense resistor R1 until the threshold set at the non-inverting input of comparator IC2 is reached. At that point the output of IC2 goes low, resetting U1's output to low, turning off T1 and also discharging C5 so that the start-up circuit is reset. The time constant of the start up circuit is longer than that of the inherent self oscillating frequency of the main control loop, so that this does not give starting pulses unless the load is so low that the main loop is turned off.

When T1 is switched off, then the voltage across Cres continues to supply current through L1 until its voltage drops to the negative forward voltage across D6 as D6 starts to conduct. Thus the current in T1 is switched off at zero volts with almost no switching loss or fast transient voltages or currents. D6 then conducts until the current in L1 is zero and at that point the current reverses to charge Cres from C2. Cres and L1 ring for about a quarter cycle and as the current then reverses again in Rz going negative below a slight positive threshold on comparator IC1, its output goes high and clocks a value equivalent to the data level on U1's D input onto the Q output of U1, turning on T1 at close to zero voltage again. This results in close to zero turn on losses. This cycle then repeats itself at high frequency in a self-oscillating mode until the voltage across C2 and the load resistor Rload reaches the reference voltage on the non-inverting input of amplifier IC3. At that point the output of IC3 starts to reduce and reduces the current threshold set on IC2. R13, 14 and C5 stabilise the loop; for a faster response and better damped response to load an input line changes a derivative series RC network in parallel with R14 is often desirable. The circuit then stabilises at an output equal to the Voltage reference on IC3. Should the load drop in value then the voltage on the junction of R20 and R21 drops below the logic threshold of U1's D input and the clock signal from IC1 then clocks a zero onto the output of U1 keeping T1 off and therefore the voltage on the output is reduced until the start-up circuit gives an occasional pulse to turn on T1. This pulse rate is chosen such that at a minimum load (for example a sensing resistor) on the output the voltage on the load cannot exceed the rated value. The circuit thus controls the output voltage under all conditions, and the maximum current output is limited by the maximum voltage that the output of IC3 can reach, which may be limited by the supply to IC3 and therefore the output there from, or by a clamping device such as a zener diode or simple diode connected across R23. This will have a negative voltage coefficient with temperature so limits at lower currents at high temperatures.

Figure 7C:
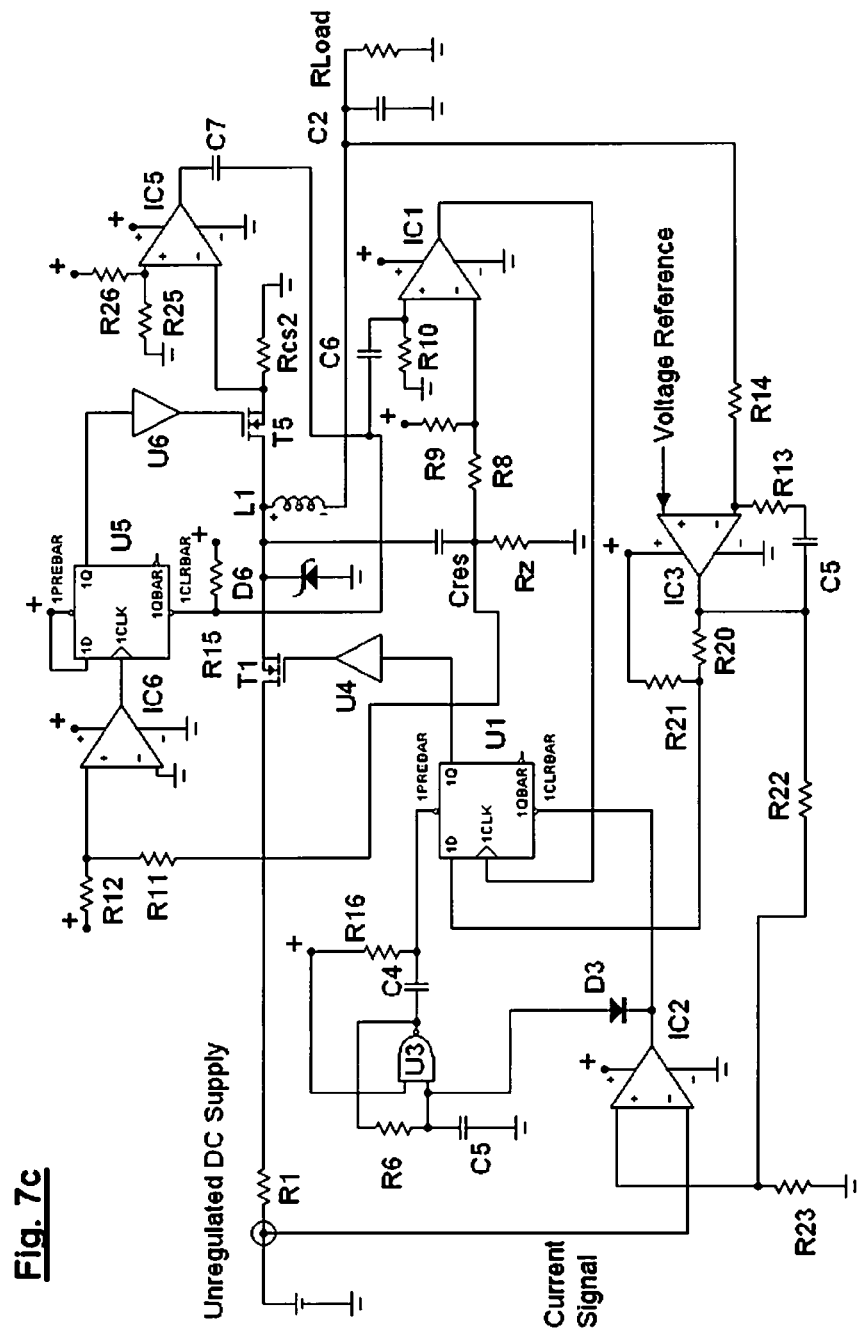

In this circuit the main losses are the on-state resistance of T1 multiplied by the RMS current through it when conducting, and the forward drop of D6 multiplied by the current through it when flywheeling when T1 is off. For this design, depending on choice of mosfet RdsON and diode type, percentage efficiency can still reach values in the mid 90's. For high current, low voltage supplies this diode loss can be substantial even with a Schottky diode and depends on the input to output voltage ratio as when the ratio is high, D6 conducts for much longer. The loss in D6 can be reduced by connecting a second power mosfet T5 across it such that this is turned on when the flywheeling mode is taking place, as shown in FIG. 7c. In the synchronously rectified method of FIG. 7a the two mosfets are switched on and off in almost exact phase opposition with only a very small Deadband to avoid shoot-through current flowing when both devices are on simultaneously. However to allow true zero voltage switching the switch on of T5 must be timed to take place after the resonant quarter cycle ring is complete and switch off before the switch on of T1. This timing is achieved by using the negative spike of current through Cres at the point of switch off of T1 (as measured by the voltage across Rz) added to a small positive bias on the non-inverting input of comparator IC6 at which instant IC6 switches momentarily high. This switches on T5 via a second flip-flop U5 and driver U6. After the current has been flowing negatively through T5 during this flywheeling period, measured by another current sense resistor Rcs2 in the source of T5, this current reduces to zero and then reverses and starts to flow positively due the semi-resonant action of Cres and L1. This change of direction is compared against a small positive reference set by R25 and R26 on the non-inverting input of comparator IC5 to reset the U5 flip-flop via a small derivative time constant C7 and R15, and turns off T5. A second small low time-constant derivative network C6, R10 from this reset pulse prevents IC1 changing state until T5 is completely off. This circuit can achieve very high percentage efficiencies in the high 90's, again dependant on the choice of mosfet RdsON for both mosfets.

Figure 7D:
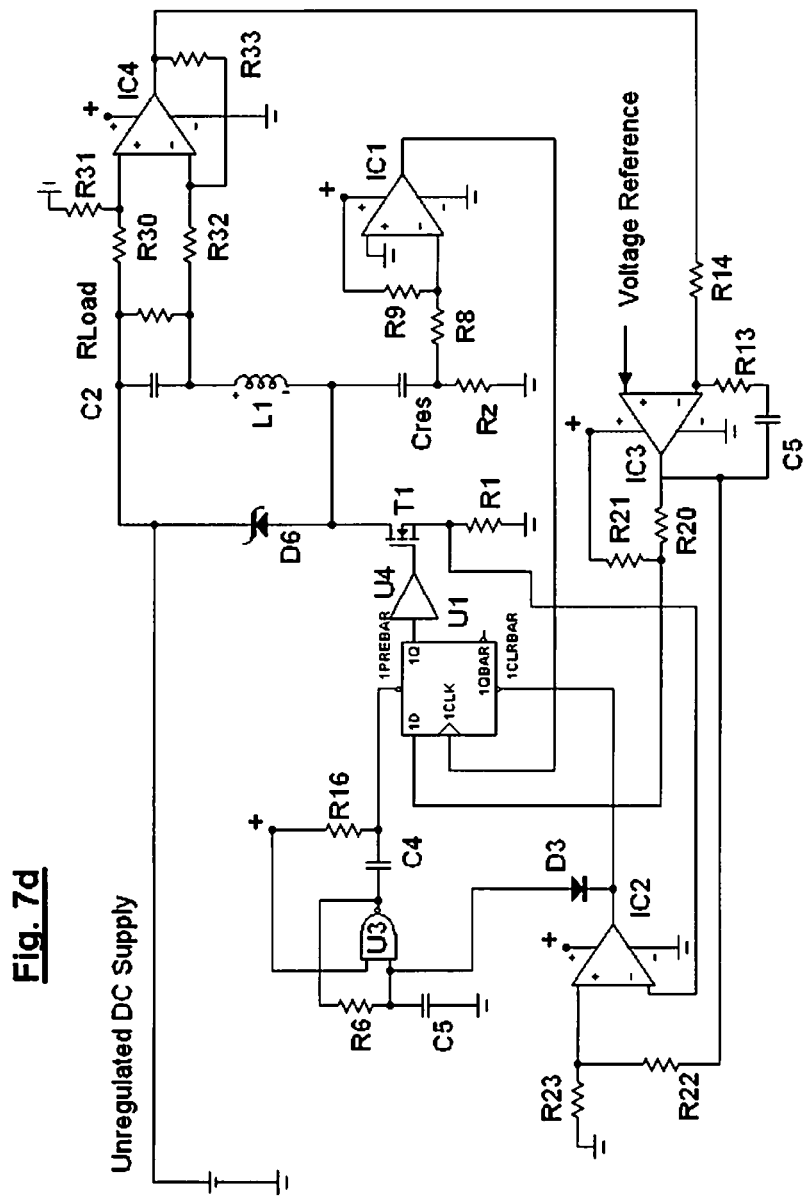
Figure 7E:
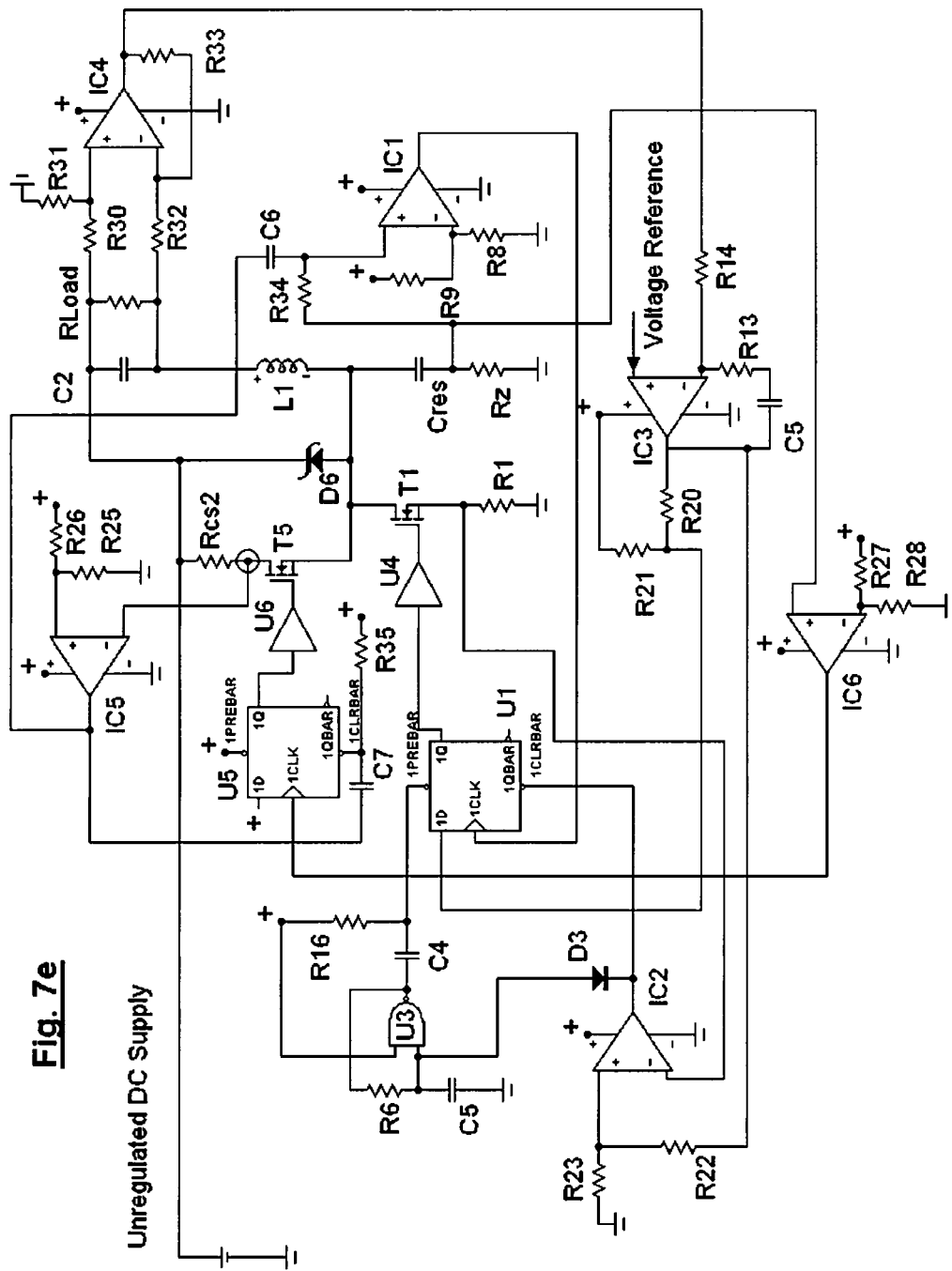

The requirement for level shifted gate drive for T1 can be removed by either using a P-channel mosfet which tends to be less efficient due to a generally higher RdsON for such devices, or altering the configuration to that of FIG. 7d, in which the negative end of the output voltage is no longer common with the negative end of the supply. In this case the voltage is level shifted by differential amplifier IC4 and resistors R30 through R33, such that its output follows the voltage across the load but referred to ground. The circuit works in exactly the same manner as that in FIG. 7b being a self-oscillating circuit with the voltage across Rz measuring the current through Cres controlling the switching times to be always at zero voltage across T1. Likewise the circuit shown in FIG. 7e demonstrates the same method but using a near-synchronous Mosfet T5 to reduce the D6 diode forward losses and enhance percentage efficiency from the mid 90's from the circuit in FIG. 7d to the high 90's for FIG. 7e. This circuit however also requires a level shifted gate drive for T5 or alternatively a P-channel mosfet, and a current sense resistor Rcs2 in the drain of T5 at the positive supply rail to provide the reset for turning off T5. Its operation differs slightly from that of FIG. 7c in that sensing the current in Cres is the opposite polarity in IC1 and IC6.

It should be noted that depending on the actual power requirement of the regulator, the current sense resistors in all these buck configurations can be very small in value, dissipate little heat, and are not required to be particularly precise, so that a section of narrowed PCB track for each can be sufficient to give sufficient voltage to sense the cross-over point, dependant of course on the amount of current flow and the inherent maximum offset voltage of the comparators.

Figure 8:
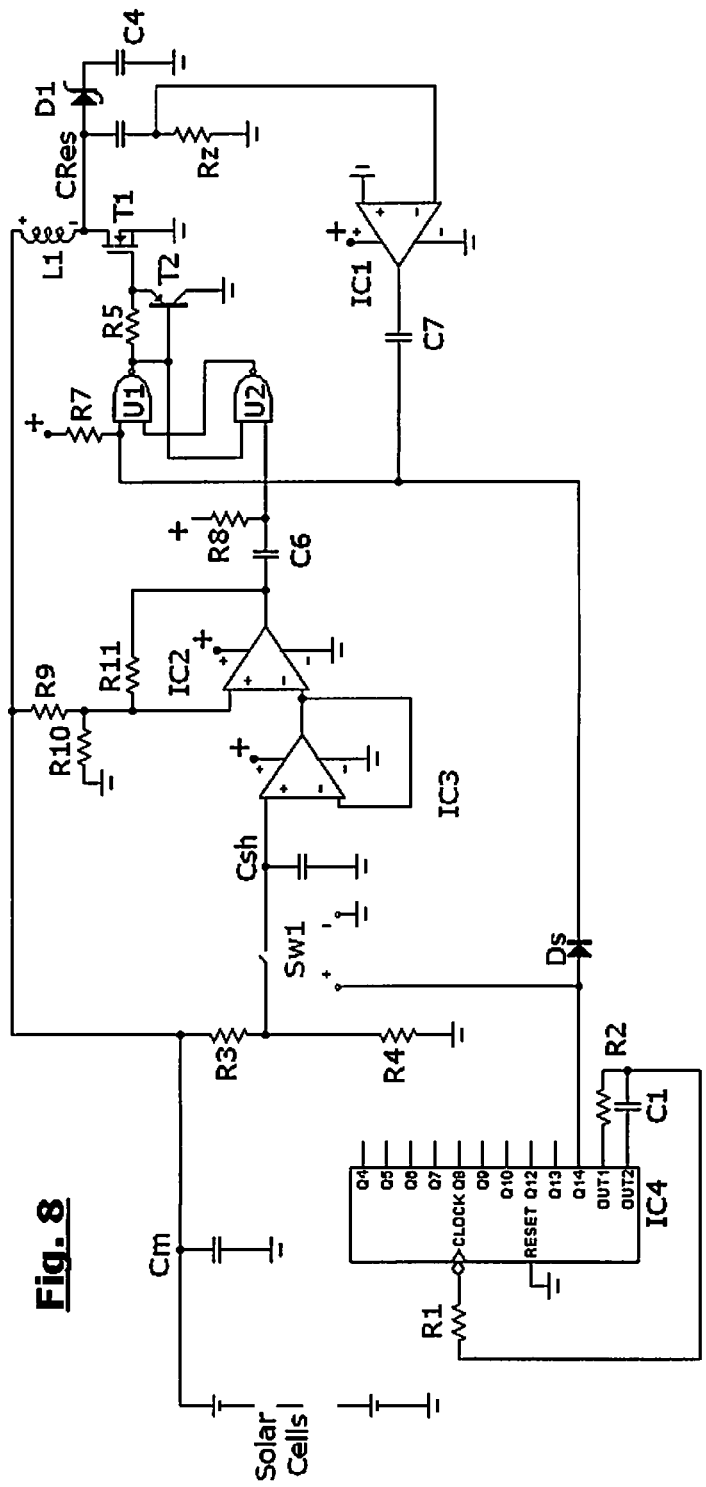
FIG. 8 illustrates in schematic form an alternative power factor control scheme, in accordance with an aspect of the present invention.

One further application of this semi-resonant boost converter is in improving the efficiency and reducing the EMI signatures of solar power converters or micro-inverters. In general it is desirable (if not necessary) to boost the voltage from a solar cell as this varies considerably due to insolation, shadowing, temperature etc. The boosted voltage can either charge a battery or supply an inverter to either power AC supplied equipment or feed back into the supply grid. Depending on the choice of switching transistor on state resistance, efficiencies can be improved from the typical low 90% level to the high 99's, and therefore has a major effect on the viability of solar cells. Such a circuit is shown in FIG. 8. In this circuit the control circuit operates very similarly to that described above, but a maximum power point circuit (MPPT) is added to ensure that the solar cell is used at its most productive condition. The cell voltage varies by temperature, shading, solar angle and load and to find the optimum point has previously required a relatively complex circuit to measure the power being supplied and iterate around the operating point adjusting the current taken to try to reach the optimum for the conditions. However as the solar cell generally has a maximum power operating point at around 84% of its open circuit voltage, it is possible to measure this voltage and control the current to achieve close to this point by briefly switching off all of the current from the cells with a very small duty cycle, until a capacitor Cm across it has charged close to the open circuit value, sampling this voltage and comparing the drawn current setting to 84% of this value. The small loss involved in this sampling period is negligible, and the sampling is easily fast enough to track shadowing due to leaves blowing in trees etc.

In FIG. 8 a digital counter with a clock oscillator free runs such that every 2^44 cycles it switches off the converter via Ds and switches on an analogue switch Sw1 which charges the sample and hold capacitor Csh to close to around 82% of the open circuit voltage of the solar cells via attenuator R3 and R4. These are high value resistors and have negligible leakage effect on the solar cell voltage. The sampled voltage on Csh is buffered by IC3 which has a very high input impedance so as not to discharge Csh. A starting circuit (similar to that in previous circuits but not shown in this drawing for clarity) first turns on transistor T1 by latching the output of the set-reset (R-S) flip-flop comprising U1 and U2, after a brief delay to establish the voltage on Csh. Current flowing through T1 and therefore L1 discharges Cm and this voltage is compared via attenuator network R9 and R10 and hysteresis resistor R11 such that when the voltage on Cm falls to around 80% of the cell's open circuit voltage the out put of IC2 goes sharply negative, resetting the R-S flip-flop and turning off T1 via R5 and T2. At this point the current from L1 is diverted from T1 to charge C4 (or a storage battery replacing C4). This may be at 12-48 Vdc or more or even to peak line voltage. Cres is discharged and at close to zero volts and therefore switch-off of T1 is nearly loss-free. Once the charge in L1 has been transferred to charge Cres and C4 or battery and its current has fallen to zero the same process as described in earlier circuits takes place, namely Cres is then charged to the voltage on C4 (or battery) and so the voltage reverses across L1 causing the semi-resonant action to take place. The current through Cres/Rz is monitored by IC1 as before such that when it starts to flow positively again the output of IC1 goes low, triggering the R-S flip-flop to turn on T1 via R5 at zero voltage across T1, and therefore without switching loss or EMI noise. The value Cm is chosen such that it recharges from the solar cell until the voltage across it is of the order of 84% of the cell's open circuit value when T1 turns on again. Thus the cell operates between 80 and 84% of open circuit voltage at all times, which is close enough to the maximum power point that a more complex tracking scheme is unnecessary.

In some applications a second boost converter may be desirable to increase the voltage from C4 or the storage battery to a sufficient value to operate a DC-AC converter at line voltage which provides AC voltage to either power local equipment or supply power back to the grid. The reason for having two different boost converters is due to the much higher on state resistances of higher voltage Mosfet devices relative to low voltage parts, so it is often better to have two stages to maximise efficiency. In this case a second boost converter employing the aforementioned semi-resonant methods described above would be desirable to maximise efficiency and minimise EMI as in all the above cases, the overall efficiency being the product of the efficiency of the two stages. For a two stage conventional boost converter at 90% each the overall efficiency would then be just 81%, whereas utilising the semi-resonant design would achieve at least 98%.

In all the above cases the necessary comparators, flip-flops, gate drivers, level shifting, references and operational amplifiers (or alternatively transconductance amplifiers) can easily be built into a single monolithic control integrated circuit which can be configured to suit all of these designs, and therefore the main additions to the original basic design of FIG. 1 and FIG. 2 are the addition of Cres and a few external components, thus realising a low component part and cost design. In the case of the power factor controlled LED drive circuit shown in FIG. 4, the currents are low enough that even the main and switching device T1 and others may be integrated into the same integrated circuit. Operating frequencies can range from kHz to upwards of 1 MHz or so, dependant on the speed of the logic and comparators. The advantages of higher frequency operation are faster load and line response as well as the reduction in size of the semi-resonating components Cres and particularly L1.

Operation at frequencies above 150 KHz will of course imply that some precautions against EMI may need to be taken, but even at the MHz range the lack of ultra-fast edges which can 'ring' with parasitic elements at radio frequencies means that the suppression of any EMI generated is much simplified. However it should also be noted that if the converters shown in FIGS. 7b through e are fed from the circuit in FIG. 6, or any supply with a little ripple or varying load, the self-oscillating frequency is modulated by the ripple voltage or load variations resulting again in a spread-spectrum of frequencies which reduces the effects of EMI markedly. The highly efficient and low EMI signature circuits in FIGS. 7b through e can of course be used on any regulated suitable or unregulated supply, not just with the power factor controllers described above.

In general under the current situation of perceived global warming, it is deemed essential that efficiency is maximised to reduce usage and therefore the carbon footprint of energy supplies. Lighting especially has a consumption of around 18%-21% of total world energy consumption.

Switching regulators are used throughout the world as an efficient and compact means of converting electrical supply from one voltage to another (usually regulated) voltage. There are several drawbacks to this approach, namely increased complexity, the switching losses which occur during the transitions of the switching devices where they have to support both voltage and current momentarily causing power to be lost in the device, and the electromagnetic interference (EMI) caused by such fast switching edges of both voltage and current.

A method of increasing the efficiency considerably while reducing the electrical noise caused by high speed edges is provided by at least one embodiment of the invention, which applies to switching regulators powered from both DC and AC sources such as the mains supply. Where the latter is used, power factor control is deemed desirable if not essential to reduce the apparent power drawn from the supply mains by an appliance attached thereto. At present, legislation often requires this to be used for appliances from 75 watts of power upwards depending on the country. This is expected to be reduced in the future, as well as an increase in the minimum power factor. For example, the standard capacitor and full wave rectifier front end used either with a transformer or direct off line can draw a harmonic current which is considerably distorted relative to the mains sine waveform. Such distortion can draw an apparent power of often more than twice the actual power used in an appliance and the harmonic distortion created in the current affects distribution transformers and generators adversely. Both increase losses in the supply chain resulting in the need to oversize supply plant to cope. One method of improving power factor which is known is to boost the voltage after rectification to a higher level than the incoming supply peaks and average the current flow from the supply so that it draws a sine wave current in phase with the supply voltage over each cycle. Such boost converters are well known, using 'hard' switched transistor devices which tend to lose efficiency in the switching periods and also create a certain amount of electromagnetic interference (EMI) due to the very fast switching edges which cause ringing at radio frequencies which must then be both screened for radiation and prevented from coupling out of the appliance along the supply cabling by means of expensive and bulky filters. In electronic lighting each unit may be suppressed for the local requirement but when groups of perhaps hundreds of bulbs are fitted the interference is additive and the power factor can be as low as 0.45 for devices like compact fluorescent bulbs. The EMI from these numerous bulbs can cause adverse effects on other equipment or radio communications even though the effect of one apparently properly suppressed bulb may be negligible.

In at least one embodiment of the invention a power factor controlling boost converter ensures switching occurs at zero voltage and as a result can mitigate these problems almost entirely. The invention can also be employed very effectively with LED bulbs of a certain design and with buck type switching Dc-Dc converters and gain advantages of a large reduction in losses and EMI. Such LED bulbs can also save energy in other ways apart from their already extremely high efficiency, such as the ease of use on dimmer circuits or incorporating self dimming and occupancy detection, and have a very important place in street lighting. This new method of switching can dramatically improve both the efficiencies of lighting and any device using power factor control from as low as 70-80% to 98% and above; losses then depend only on the on-state loss of the switching device, not its switching speed.

Apart from the huge savings in lighting power usage, there are 1-2 billion computers worldwide using perhaps 3 Terawatt-hours of electricity a year out of roughly 18 Terawatt hours of world consumption, and adopting this improved method could save 10-18% of that figure, resulting in a significant decrease in greenhouse gas production. A secondary advantage of increased efficiency is the saving of several times the reduction in losses in both computers and lighting in the reduction in heat load needing to be removed by the air conditioning. In an office using many lights this is very significant.

Throughout the specification, unless the context demands otherwise, the terms 'comprise' or 'include', or variations such as 'comprises' or 'comprising', 'includes' or 'including' will be understood to imply the inclusion of a stated integer or group of integers, but not the exclusion of any other integer or group of integers.

Further modifications and improvements may be added without departing from the scope of the invention herein described. Furthermore, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of zero voltage switching for power factor control, the method comprising the steps of:
   (a) providing a capacitor in parallel with a switching device;
   (b) detecting the polarity of the current through the capacitor;
   (c) operating the switch responsive to a change in the polarity of the current through the capacitor; and
   altering a peak current in the switching device responsive to a comparison between an output voltage or current from a storage capacitor and a reference voltage or current.

2. A power factor controller comprising:
   a capacitor in parallel with a switching device;
   a polarity sensing device configured to sense the polarity of current passing through the capacitor; and
   a storage capacitor;
   wherein the switching device is operated responsive to a change in the polarity of the current through the capacitor, and the peak current in the switching device is altered responsive to a comparison between an output current from the storage capacitor and a reference current.

3. A LED light source comprising one or more LEDs and the power factor controller of claim 2.

4. The LED light source of claim 3, further comprising a variably occluded phototransistor configured to measure ambient light levels and a regulator circuit configured to adjust the output of the one or more LEDs responsive to the ambient light levels.

5. The LED light source of claim 3, further comprising a current sensor and a controller configured to control a holding current of an external dimmer switch by comparing input current to a reference and selectively driving a load on or off to take more or less current, respectively, from the dimmer switch responsive to a difference between the input current and the reference.

6. The LED light source of claim 3, further comprising one or more resistances and a controller configured to selectively switch in said one or more resistances to limit inrush current on determination of the action of an external dimmer switch.

7. The LED light source of claim 3, further comprising a capacitive sensor configured to control the power factor controller so as to alter the brightness of the one or more LEDs responsive to a determination of proximity of a moving person or conductive object in the vicinity of the LED light source, wherein the capacitive sensor comprises a capacitance-sensitive oscillator connected to a phase-locked loop and a voltage sensor configured to detect changes in a voltage of the phase-locked loop.

8. The LED light source of claim 7, wherein the capacitive sensor comprises first and second spaced conductive panels, the first or the second conductive panel connected to a safety capacitor whereby the capacitive sensor is sensitive to changes in capacitance on the same side of the LED light source as the other conductive panel.

9. The LED light source of claim 7, wherein the capacitive sensor is configured to compare a trend of detected capacitance changes with a detected capacitance change, and selectively control the brightness of the one or more LEDs dependent on the comparison.

10. The LED light source of claim 9, wherein the capacitive sensor comprises a capacitance to digital converter and a microcontroller, the microcontroller configured to carry out the comparison on signals from the capacitance to digital converter.

* * * * *

UNITED STATES PATENT AND TRADEMARK OFFICE
CERTIFICATE OF CORRECTION

| | | |
|---|---|---|
| PATENT NO. | : 8,830,702 B2 | Page 1 of 1 |
| APPLICATION NO. | : 13/175417 | |
| DATED | : September 9, 2014 | |
| INVENTOR(S) | : Macfarlane | |

It is certified that error appears in the above-identified patent and that said Letters Patent is hereby corrected as shown below:

In the specification

Column 3
Line 9, change "Dc voltage" to --DC voltage--

Column 6
Line 47, change "much high efficiency" to --much higher efficiency--

Column 9
Line 28, change "this shown" to --this is shown--

Column 14
Line 38, change "so can" to --so it can--

Column 15
Line 33, change "The secondary of the transformer" to --The secondary winding of the transformer--

Column 19
Line 1, change "discharged and at" to --discharged at--

Column 20
Line 61, change "Dc-Dc" to --DC-DC--

Signed and Sealed this
Twenty-third Day of February, 2016

Michelle K. Lee
*Director of the United States Patent and Trademark Office*